United States Patent
Kimishima et al.

(10) Patent No.: US 12,126,899 B2
(45) Date of Patent: Oct. 22, 2024

(54) IMAGING DEVICE, IMAGING CONTROL DEVICE, AND IMAGING METHOD

(71) Applicant: SONY GROUP CORPORATION, Tokyo (JP)

(72) Inventors: Yu Kimishima, Tokyo (JP); Yohei Takada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 54 days.

(21) Appl. No.: 17/311,170

(22) PCT Filed: Oct. 24, 2019

(86) PCT No.: PCT/JP2019/041646
§ 371 (c)(1),
(2) Date: Jun. 4, 2021

(87) PCT Pub. No.: WO2020/121654
PCT Pub. Date: Jun. 18, 2020

(65) Prior Publication Data
US 2021/0360146 A1 Nov. 18, 2021

(30) Foreign Application Priority Data
Dec. 14, 2018 (JP) .................................. 2018-234123

(51) Int. Cl.
*H04N 23/67* (2023.01)
*G03B 17/12* (2021.01)
(Continued)

(52) U.S. Cl.
CPC ............. *H04N 23/67* (2023.01); *G03B 17/12* (2013.01); *H04N 23/633* (2023.01); *H04N 23/73* (2023.01)

(58) Field of Classification Search
CPC ......... H04N 5/23212; H04N 5/232939; H04N 5/2353; H04N 5/23218; H04N 5/23245;
(Continued)

(56) References Cited

U.S. PATENT DOCUMENTS

2005/0264679 A1 12/2005 Sasaki et al.
2009/0238549 A1 9/2009 Kanayama
(Continued)

FOREIGN PATENT DOCUMENTS

EP 1601189 A2 11/2005
EP 2104338 A2 9/2009
(Continued)

OTHER PUBLICATIONS

International Search Report and Written Opinion of PCT Application No. PCT/JP2019/041646, issued on Dec. 10, 2019, 07 pages of ISRWO.

*Primary Examiner* — Lin Ye
*Assistant Examiner* — Tuan H Le
(74) *Attorney, Agent, or Firm* — CHIP LAW GROUP

(57) ABSTRACT

An imaging device includes an autofocus control unit that performs autofocus control in response to detection of a first operation using a first operator, and a tracking processing unit that performs tracking processing for a subject to be focused in response to detection of a second operation using a second operator different from the first operator in a state where autofocus control is performed in response to the first operation.

19 Claims, 22 Drawing Sheets

| PATTERN | P1 | P2 | P3 | p4 |
|---|---|---|---|---|
| STEP 1 | HALF-PRESSING | HALF-PRESSING | TRACKING OPERATION | TRACKING OPERATION |
| STEP 2 | TRACKING OPERATION | TRACKING OPERATION | HALF-PRESSING | HALF-PRESSING |
| STEP 3 | TRACKING CANCEL | HALF-PRESSING CANCEL | HALF-PRESSING CANCEL | TRACKING CANCEL |
| STEP 4 | HALF-PRESSING CANCEL | TRACKING CANCEL | TRACKING CANCEL | HALF-PRESSING CANCEL |

(51) Int. Cl.
*H04N 23/63* (2023.01)
*H04N 23/73* (2023.01)

(58) Field of Classification Search
CPC ....... H04N 5/232945; H04N 5/232127; H04N 23/67; H04N 23/633; H04N 23/73; H04N 23/61; H04N 23/635; H04N 23/667; H04N 23/675; G03B 17/12; G03B 13/36; G03B 17/14; G03B 17/18; G02B 7/38
See application file for complete search history.

(56) References Cited

U.S. PATENT DOCUMENTS

| | | | | |
|---|---|---|---|---|
| 2012/0045094 | A1* | 2/2012 | Kubota | H04N 23/611 |
| | | | | 382/103 |
| 2012/0121241 | A1* | 5/2012 | Kim | H04N 5/232945 |
| | | | | 396/124 |
| 2015/0029347 | A1* | 1/2015 | Tsubusaki | H04N 23/64 |
| | | | | 348/208.1 |
| 2016/0028939 | A1* | 1/2016 | Ogawa | H04N 23/69 |
| | | | | 348/346 |
| 2016/0227104 | A1* | 8/2016 | Guan | H04N 5/232127 |
| 2020/0228727 | A1* | 7/2020 | Zheng | H04N 5/23212 |

FOREIGN PATENT DOCUMENTS

| | | |
|---|---|---|
| JP | 2005-338352 A | 12/2005 |
| JP | 2009-229568 A | 10/2009 |
| JP | 2015-111746 A | 6/2015 |

* cited by examiner

FIG. 11

| PATTERN | p1 | p2 | p3 | p4 |
|---|---|---|---|---|
| STEP 1 | HALF-PRESSING | HALF-PRESSING | TRACKING OPERATION | TRACKING OPERATION |
| STEP 2 | TRACKING OPERATION | TRACKING OPERATION | HALF-PRESSING | HALF-PRESSING |
| STEP 3 | TRACKING CANCEL | HALF-PRESSING CANCEL | HALF-PRESSING CANCEL | TRACKING CANCEL |
| STEP 4 | HALF-PRESSING CANCEL | TRACKING CANCEL | TRACKING CANCEL | HALF-PRESSING CANCEL |

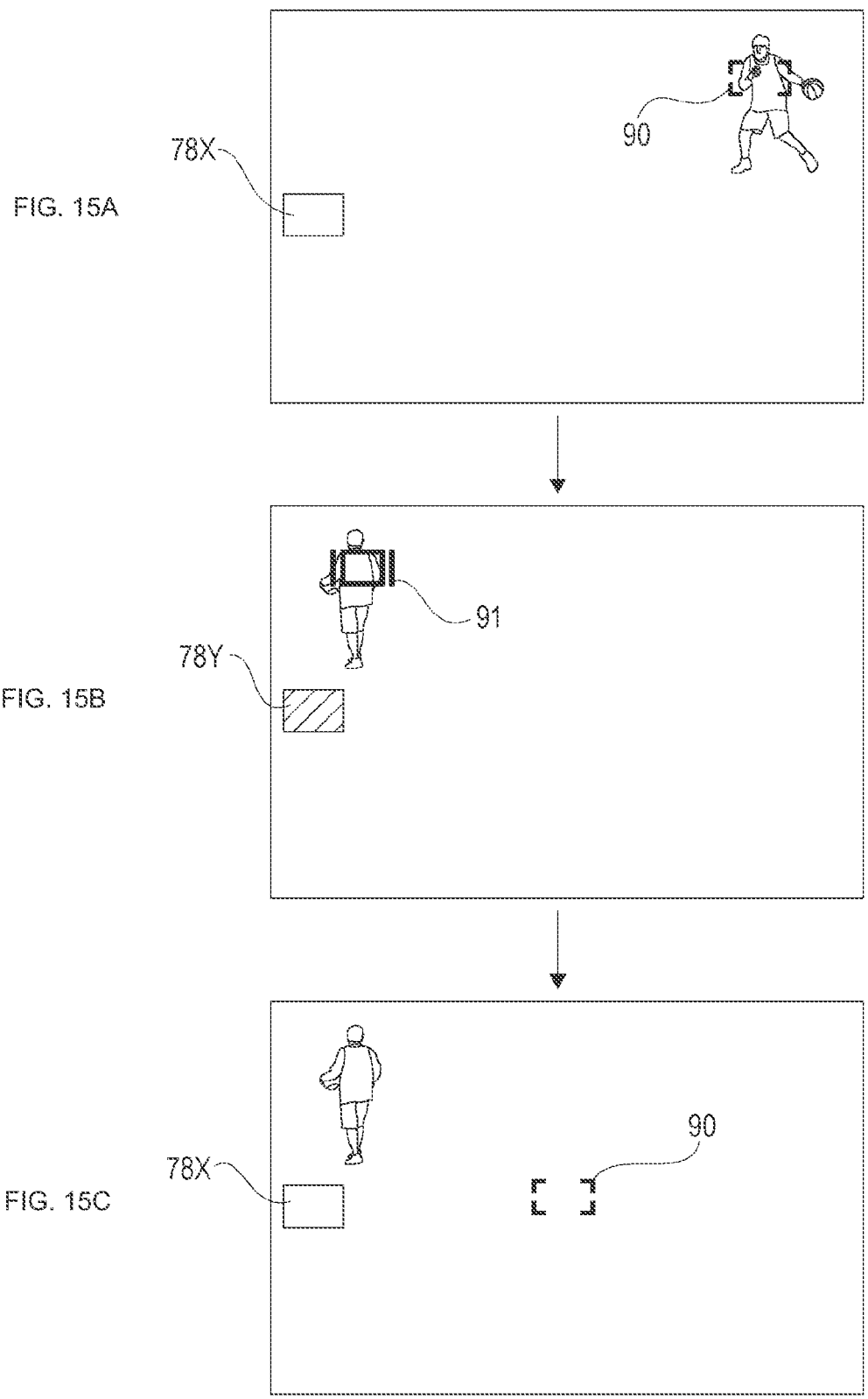

IMAGING DEVICE, IMAGING CONTROL DEVICE, AND IMAGING METHOD

CROSS REFERENCE TO RELATED APPLICATIONS

This application is a U.S. National Phase of International Patent Application No. PCT/JP2019/041646 filed on Oct. 24, 2019, which claims priority benefit of Japanese Patent Application No. JP 2018-234123 filed in the Japan Patent Office on Dec. 14, 2018. Each of the above-referenced applications is hereby incorporated herein by reference in its entirety.

TECHNICAL FIELD

The present technology relates to an imaging device, an imaging control device, and an imaging method, and particularly to a technology for autofocusing and tracking operations of an imaging device.

BACKGROUND ART

Autofocus is a widely adopted function in the field of imaging devices. For example, there is an imaging device in which an autofocus operation is performed by a half-press operation of a shutter button.

Additionally, in recent years, there has also been an imaging device that uses technologies of captured image analysis and subject recognition to autofocus on a target subject while tracking the subject.

The following Patent Document 1 describes a technology related to an autofocus operation and a tracking operation.

CITATION LIST

Patent Document

Patent Document 1: Japanese Patent Application Laid-Open No. 2015-111746

SUMMARY OF THE INVENTION

Problems to be Solved by the Invention

Incidentally, when using an imaging device, simple and intuitive operability is required so as not to miss a so-called imaging opportunity.

Here, for the operation of tracking a target subject on a captured image (frame) while autofocusing on the subject, the user may perform normal autofocusing by a half-press operation of the same shutter button.

That is, by selecting a tracking mode in advance, when the user half-presses the shutter button, the imaging device autofocuses on a certain subject, and thereby tracks the focused subject. However, with such an operation method, it is difficult to freely use tracking and autofocus separately.

On the other hand, tracking and autofocus are also meaningful in cooperation. It is difficult to accurately recognize and track a subject that is not in focus, and since a subject is tracked when aiming for an imaging opportunity, it is important that the subject is in focus by the autofocus operation.

In view of the foregoing, an object of the present technology is to enable various user operations with easy operability while appropriately achieving cooperation between autofocus and tracking.

Solutions to Problems

An imaging device according to the present technology includes an autofocus control unit that performs autofocus control in response to detection of a first operation using a first operator, and a tracking processing unit that performs tracking processing for a subject to be focused in response to detection of a second operation using a second operator different from the first operator in a state where autofocus control is performed in response to the first operation.

Autofocus control is control for operating the imaging lens system so as to automatically focus on a certain subject with different conditions depending on various focus modes.

Tracking processing is processing of tracking a subject focused by such autofocus control within each frame of a captured image, and maintaining the focused state of the subject.

In the imaging device according to the present technology described above, the autofocus control unit may perform focus control on a subject to be tracked in response to the tracking processing being performed by the second operation in the state where the autofocus control is performed in response to the first operation.

As a result, the first operation and the second operation are performed to set the focus target as the tracking target. The focus area setting for the subject to be tracked is a setting for moving the autofocus control target according to the position of the subject to be tracked.

The imaging device according to the present technology described above may further include a display control unit that performs control to change a display on a display unit indicating an operating state, depending on whether it is a first state where the autofocus control is performed in response to the first operation and the tracking processing is not performed, or it is a second state where the tracking processing and the focus control on the subject to be tracked are performed in response to the first operation and the second operation.

For example, when displaying the operating state of the imaging device on a display unit such as a display panel, a viewfinder, or an external display device, displays indicating different operating states are presented for a period during which only the first operation is performed, and a period during which the first operation and the second operation are performed. For example, the icon to be displayed is switched between the icon corresponding to the first state and the icon corresponding to the second state.

The imaging device according to the present technology described above may further include a display control unit that controls a display operation of a display unit so that a focus frame indicating a focusing area is displayed at a predetermined position in a first state where the autofocus control is performed in response to the first operation and the tracking processing is not performed, and a tracking frame is displayed at a position of a subject image to be tracked in a second state where the tracking processing and the focus control on the subject to be tracked are performed in response to the first operation and the second operation.

For example, a focus frame corresponding to autofocus control or a tracking frame corresponding to a tracking operation is displayed on a display unit such as a display panel, a viewfinder, or an external display device.

In the imaging device according to the present technology described above, the display control unit may control the display operation of the display unit so that in the second state, the tracking frame is displayed while maintaining display of the focus frame in the immediately preceding first state.

For example, a focus frame corresponding to the autofocus control is displayed on a display unit such as a display panel, a viewfinder, or an external display device, and the focus frame is kept displayed even during the tracking.

In the imaging device according to the present technology described above, when transitioning from the second state to the first state, the autofocus control unit may start autofocus control before the start of the tracking operation in the immediately preceding second state, and the display control unit may end the display of the tracking frame and causes the focus frame to be displayed in a state before the start of tracking.

When the first operation is performed to transition to the first state, the autofocus control is performed according to the settings related to the autofocus control, and the focus frame corresponding to the setting is displayed. Then, when transitioning to the second state and returning to the first state from the second state due to cancellation of the second operation, the autofocus control is performed in the original state before the tracking, and the display of the focus frame corresponding to the autofocus control is resumed.

In the imaging device according to the present technology described above, when transitioning from the second state to the first state, the autofocus control unit may start autofocus control for an area based on a position of the tracking frame at the end of tracking, and the display control unit may end the display of the tracking frame and causes the focus frame to be displayed at the position of the tracking frame at the end of tracking.

When the first operation is performed to transition to the first state, the autofocus control is performed according to the settings related to the autofocus control, and the focus frame corresponding to the setting is displayed. Then, when transitioning to the second state and returning to the first state from the second state due to cancellation of the second operation, the autofocus control is performed in an area at the end of tracking, and the display of the focus frame corresponding to the autofocus control is presented in place of the tracking frame.

In the imaging device according to the present technology described above, when transitioning from the second state to the first state, the autofocus control unit may start autofocus control targeting a fixed area of a captured image, and the display control unit may end the display of the tracking frame and causes the focus frame to be displayed in the fixed area of the captured image.

When the first operation is performed to transition to the first state, the autofocus control is performed according to the settings related to the autofocus control, and the focus frame corresponding to the setting is displayed. Then, when transitioning to the second state and returning to the first state from the second state due to cancellation of the second operation, the autofocus control targeting the area in the center of an image, for example, is forcibly performed, and the display of the focus frame corresponding to the autofocus control is presented in the center area.

In the imaging device according to the present technology described above, when the second operation is detected with no detection of the first operation, a focus area setting in autofocus control may be set to target a subject to be tracked.

The focus area setting for the subject to be tracked is a setting for moving the autofocus control target according to the position of the subject to be tracked.

In the imaging device according to the present technology described above may further include a display control unit that causes a display unit to present a display corresponding to the fact that the focus area setting in autofocus control has been set to target the subject to be tracked when the second operation is detected with no detection of the first operation.

For example, an icon display or a message display is used to indicate to the user that the autofocus control target is set to move according to the position of the subject to be tracked.

In the imaging device according to the present technology described above, in a case where the second operation is detected with no detection of the first operation and the first operation is detected after the second operation, the tracking processing unit may perform tracking processing on a subject to be focused, and the autofocus control unit may perform autofocus control on a subject to be tracked.

That is, when the second operation and the first operation are performed in this order, tracking of the tracking target subject and the autofocus control are started as the focus area setting for the tracking target subject.

In the imaging device according to the present technology described above, when cancellation of the first operation is detected in a state where the tracking processing unit performs tracking processing on a subject to be focused and the autofocus control unit performs autofocus control on a subject to be tracked in response to the first operation and the second operation, the tracking processing and the autofocus control may be ended, and a focus area setting in autofocus control may be maintained at the setting that targets the subject to be tracked.

If the autofocus instruction by the first operation is canceled while the second operation is maintained when tracking of the subject to be tracked and autofocus control are being performed, the focus area setting is maintained as it is.

In the imaging device according to the present technology described above, the second operation may be performed as a continuous operation of the operator for the second operation, and the second operation may be canceled with the end of the continuous operation.

For example, it is assumed that the second operation is being performed while the button as the operator is being held down.

In the imaging device according to the present technology described above, the second operation may be performed as a single operation of the operator for the second operation, and the second operation may be canceled by another single operation of the operator.

For example, on and off as a second operation is performed as a toggle operation of a button as an operator.

In the imaging device according to the present technology described above, the second operator may be provided on a lens barrel that is mountable on an imaging device main body.

For example, the second operator is an operator provided on the lens barrel as an interchangeable lens that can be attached to and detached from the imaging device.

In the imaging device according to the present technology described above, an assignable button to which an operation function as the second operation can be selectively set may be provided.

That is, the assignable button that can be arbitrarily set by the user is used as the second operator that performs the second operation.

In the imaging device according to the present technology described above, the first operator may be a shutter operator, and half-pressing of the shutter operator may be the first operation.

While half-pressing of the shutter operator is used as an autofocus instruction, half-pressing of the shutter button does not cause tracking.

In the imaging device according to the present technology described above, the second operator may be provided at a position where it is operable during operation of the first operator.

That is, the first operator and the second operator are arranged so that they can be operated at the same time. For example, an arrangement in which both operators can be operated with different fingers of one hand, or an arrangement in which the first operator can be operated with one hand while the second operator can be operated with the other hand may be used.

An imaging control device according to the present technology includes the above-mentioned autofocus control unit and tracking processing unit.

An imaging method according to the present technology is an imaging method including performing autofocus control in response to detection of a first operation using a first operator, and performing tracking processing for a subject to be focused in response to detection of a second operation using a second operator different from the first operator in a state where autofocus control is performed in response to the first operation by an imaging device.

That is, the imaging device recognizes the autofocus instruction and the tracking instruction as separate operations, and the tracking and autofocus operations are performed on the same target by the first operation and the second operation.

BRIEF DESCRIPTION OF DRAWINGS

FIG. 11 is an explanatory diagram of patterns of an operation procedure of the embodiment.

FIGS. 15A, 15B, and 15C are explanatory diagrams of a focus frame display example of the embodiment.

MODE FOR CARRYING OUT THE INVENTION

Hereinafter, embodiments will be described in the following order.

<1. Configuration of Imaging Device>
<2. First embodiment>
<3. Second embodiment>
<4. Third embodiment>
<5. Summary and modification>
<6. Application example>

Note that the term "autofocus" is also denoted as "AF".

An example of a first operation is a half-press operation of a shutter button 110S described later. This operation is also simply denoted as "half-pressing". Half-pressing is an operation in which the user gives an instruction on autofocus control.

An example of a second operation is an operation of pressing an assignable button 110C or 120C described later. This is an operation in which the user gives an instruction on tracking. Note that while the button operation for giving an instruction on tracking will be described in the case of continuous pressing and the case of a single press, the operation in which the user gives an instruction on tracking by the assignable button 110C or 120C is denoted as "tracking operation", and the state in which the tracking instruction is canceled or no instruction is given is denoted as "tracking cancel".

While the operation of autofocusing on a target while tracking is called "tracking AF" or "tsuibi (tracking) AF", in the embodiments, the operation is denoted as "tracking AF".

1. Configuration of Imaging Device

Figure 1:
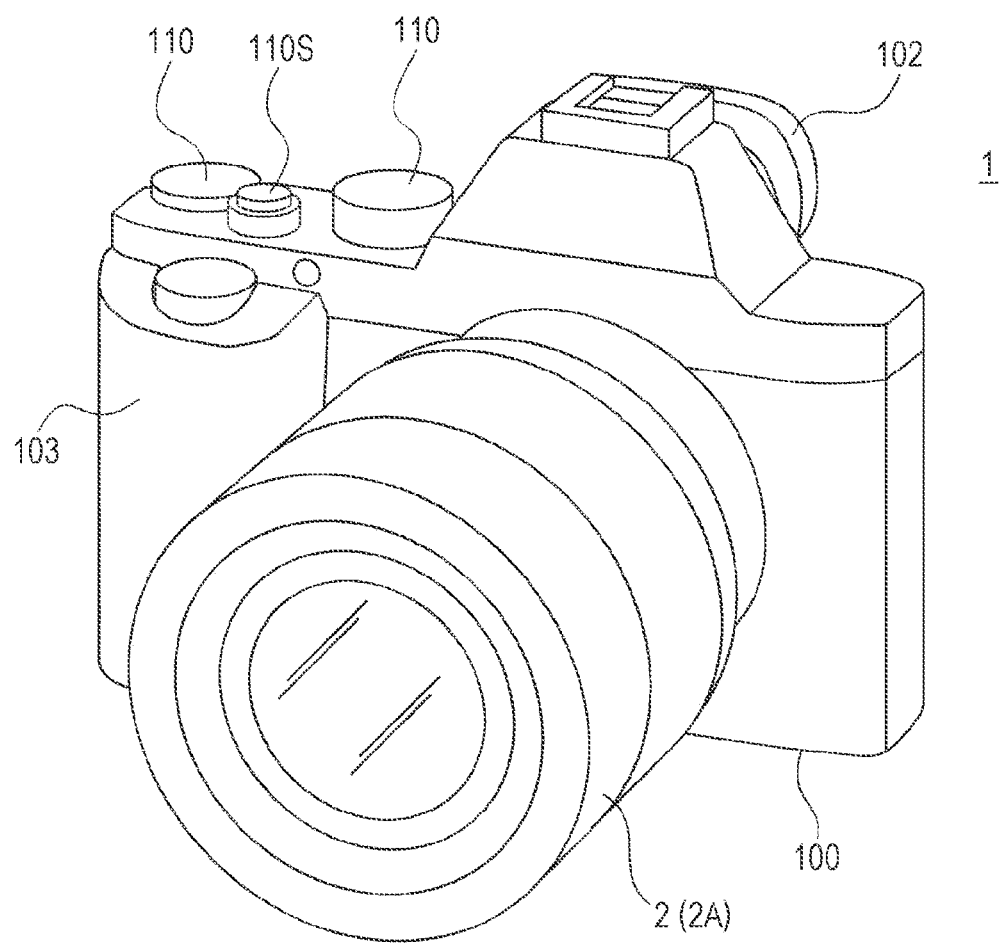
FIG. 1 is a perspective view of the appearance of an imaging device according to an embodiment of the present technology.
Figure 2:
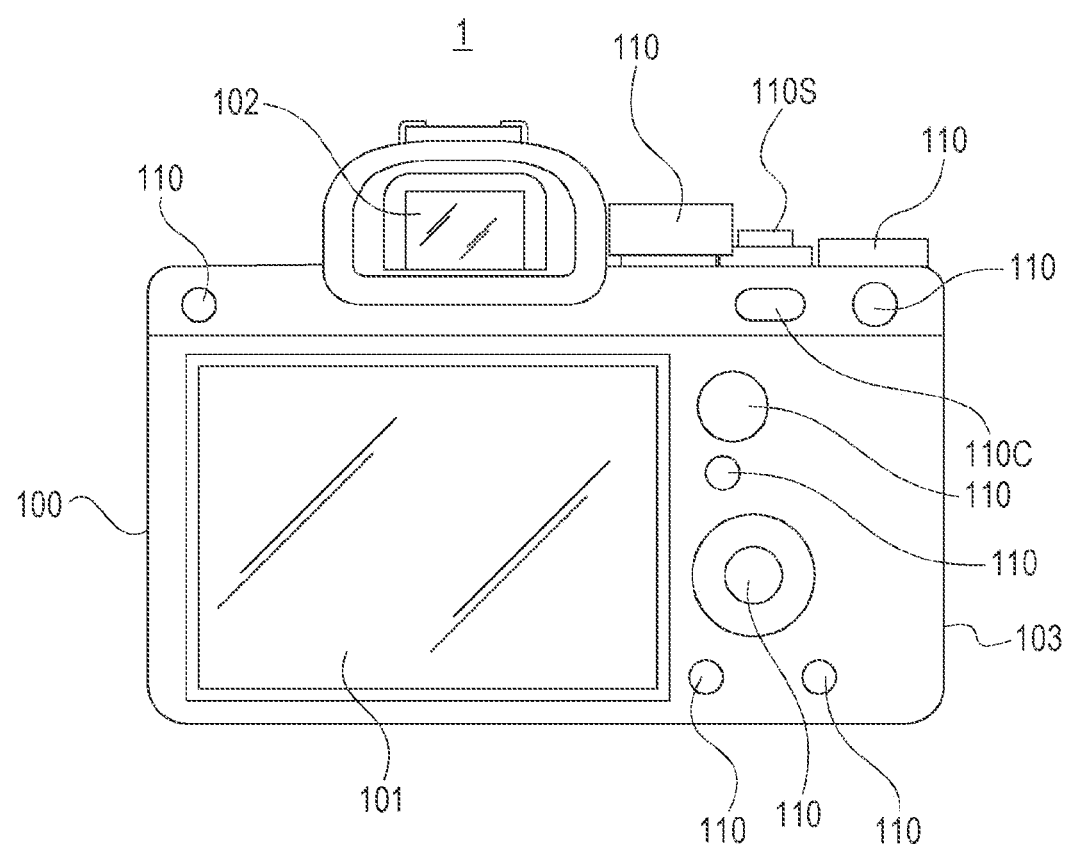
FIG. 2 is a rear view of the imaging device of the embodiment.

FIG. 1 shows a perspective view of an imaging device 1 of the embodiment from the front, and FIG. 2 shows a rear view thereof. Here, the imaging device 1 is a so-called digital still camera, and is capable of capturing both still images and moving images by switching the imaging mode.

Note that in the present embodiment, the imaging device 1 is not limited to a digital still camera, and may be a video camera mainly used for capturing moving images and capable of capturing still images.

In the imaging device 1, a lens barrel 2 (lens barrel 2A in FIG. 1) is arranged on or is detachable from the front side of a main body housing 100 forming a camera body.

A display panel 101 using a display device such as a liquid crystal display (LCD) or an organic electro-luminescence (EL) display is provided on the back side (user side) of the imaging device 1.

Additionally, a display unit formed by using an LCD, an organic EL display, or the like is also provided as a viewfinder 102. Additionally, the viewfinder 102 is not limited to an electronic viewfinder (EVF), but may be an optical viewfinder (OVF).

The user can visually recognize an image and various information by the display panel 101 and the viewfinder 102.

While the imaging device 1 is provided with both the display panel 101 and the viewfinder 102 in this example, it is not limited to this. The imaging device 1 may have just one of the display panel 101 and the viewfinder 102, or both or one of the display panel 101 and the viewfinder 102 may be detachable.

Various operators 110 are provided on the main body housing 100 of the imaging device 1.

For example, the operator 110 is provided in various forms such as a key, a dial, and a combined press/rotation operator to achieve various operation functions. For example, a menu operation, a playback operation, a mode selection operation, a focus operation, a zoom operation, a selection operation of parameters such as shutter speed and F value (F-number) can be performed. Although detailed description of each of the operators 110 is omitted, in the case of the present embodiment, the shutter button 110S and the assignable button 110C are particularly shown among the operators 110.

The shutter button 110S is used for a shutter operation (release operation) and AF operation by half-pressing.

The assignable button 110C is an operator, also called a custom button, and is a button to which the user can assign an arbitrary operation function. In the present embodiment, it is assumed that a tracking instruction operation is assigned to the assignable button 110C. That is, the assignable button 110C serves as an operator for the tracking operation.

The shutter button 110S is arranged on a right upper surface of the main body housing 100, and the user can press the shutter button 110S with the right index finger while holding a grip portion 103 with the right hand, for example.

Additionally, the assignable button 110C is arranged in a back upper portion of the main body housing 100 as shown in FIG. 2, and the user can press the assignable button 110C with the right thumb, for example.

That is, the shutter button 110S and the assignable button 110C are arranged at positions where they can be operated with the index finger and thumb when the user holds the main body housing 100 by gripping the grip portion 103 with the right hand. In other words, the shutter button 110S and the assignable button 110C are arranged so that they can each be arbitrarily pressed separately, or be pressed simultaneously.

Note that the shutter button 110S and the button for the tracking operation do not necessarily have to be simultaneously operable with one hand. For example, the shutter button 110S may be pressed with the right hand so that the tracking operation can be performed with the left hand.

Hence, the tracking operation may be performed by using a button on the lens barrel 2, for example.

Figure 3:
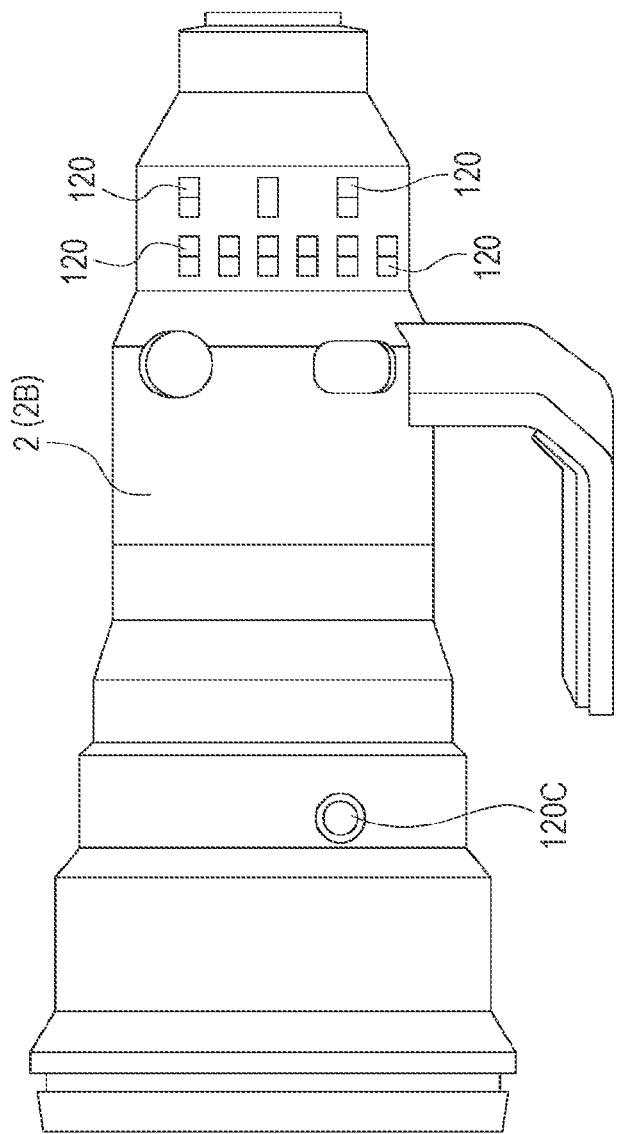
FIG. 3 is a side view of a lens barrel that can be mounted on the imaging device of the embodiment.

For example, FIG. 3 shows an example of a lens barrel 2B that can be mounted on the front side of the main body housing 100. Various operators 120 are provided on the lens barrel 2B as well.

In this case, the assignable button 120C provided in a relatively low position on a side surface portion is assigned the role of a tracking operation button.

Normally, the user performs imaging by gripping the grip portion 103 with the right hand and supporting the lens barrel 2 from below with the left hand. In this case, the assignable button 120C can be pressed with the left thumb.

Even with such an arrangement, the shutter button 110S and the assignable button 120C can be operated simultaneously or be arbitrarily operated separately.

Note that a non-assignable dedicated tracking operation button may be provided in the position of the assignable button 110C or 120C.

Additionally, in a case where multiple assignable buttons are provided on the main body housing 100, it is appropriate that a button that can be operated together with the shutter button 110S be assigned the role of a tracking operation button. On the other hand, on the imaging device 1 side, it is only required that the assignable button be arranged assuming such a position suitable for simultaneous operation with the shutter button 110S.

Figure 4:
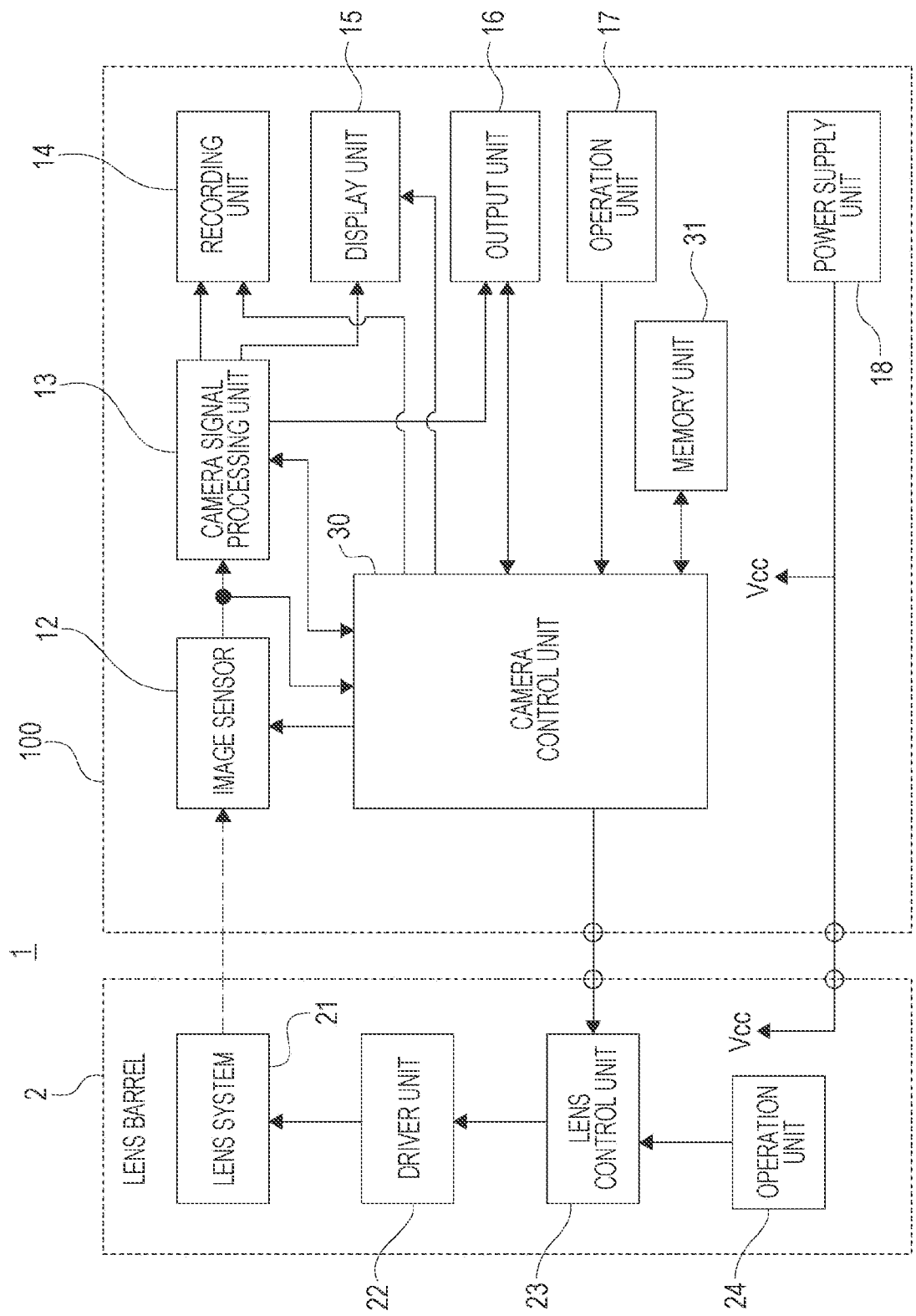
FIG. 4 is a block diagram of an internal configuration of the imaging device according to an embodiment.

FIG. 4 shows the internal configuration of the imaging device 1 including the lens barrel 2. Note that while the imaging device 1 is divided into the main body housing 100 and the lens barrel 2 in this example, the portion corresponding to the lens barrel 2 may be integrated with the main body housing 100.

The imaging device 1 has, in the main body housing 100, an image sensor 12, a camera signal processing unit 13, a recording unit 14, a display unit 15, an output unit 16, an operation unit 17, a power supply unit 18, a camera control unit 30, and a memory unit 31.

Additionally, the lens barrel 2 has a lens system 21, a driver unit 22, a lens control unit 23, and an operation unit 24.

The lens system 21 in the lens barrel 2 includes lenses such as a cover lens, a zoom lens, and a focus lens, and an aperture (iris) mechanism. Light from the subject (incident light) is guided by the lens system 21 and is focused on the image sensor 12 in the imaging device 1.

For example, the image sensor 12 is a charge coupled device (CCD) type, a complementary metal oxide semiconductor (CMOS) type, or the like.

For example, the image sensor 12 performs, on an electric signal obtained by performing photoelectric conversion on received light, correlated double sampling (CDS) processing, automatic gain control (AGC) processing, and the like, and also analog/digital (A/D) conversion processing. Then, the image sensor 12 outputs an imaging signal as digital data to the subsequent camera signal processing unit 13 and camera control unit 30.

The camera signal processing unit 13 is an image processor including a digital signal processor (DSP) or the like, for example. The camera signal processing unit 13 performs various signal processing on a digital signal (captured image signal) from the image sensor 12. For example, the camera signal processing unit 13 performs preprocessing, synchronization processing, YC generation processing, resolution conversion processing, codec processing, and the like.

In preprocessing, the captured image signal from the image sensor 12 is subjected to clamp processing for clamping the black levels of R, G, and B to a predetermined level, and correction processing among the color channels of R, G, and B, for example.

In synchronization processing, demosaic processing is performed so that the image data for each pixel has all the color components of R, G, and B.

In YC generation processing, a luminance (Y) signal and a color (C) signal are generated (separated) from the image data of R, G, and B.

In resolution conversion processing, resolution conversion processing is performed on the image data subjected to various signal processing.

In codec processing, the resolution-converted image data is subjected to encoding for recording or communication, for example.

The recording unit 14 includes a non-volatile memory, for example, and stores image files (content files) such as still image data and moving image data, attribute information of the image files, thumbnail images, and the like.

The image files are stored in formats such as joint photographic experts group (JPEG), tagged image file format (TIFF), and graphics interchange format (GIF).

The recording unit 14 can be implemented in various ways. For example, the recording unit 14 may be a flash memory built in the imaging device 1, or may take the form of a memory card (e.g., portable flash memory) that can be attached to and detached from the imaging device 1 and a card recording/playback unit that performs recording/playback access to the memory card. Additionally, the recording unit 14 may be implemented as a hard disk drive (HDD) as a form built in the imaging device 1, for example.

The display unit 15 is a display unit that presents various displays to the image capturing person, and specifically, represents the display panel 101 and the viewfinder 102 shown in FIG. 2.

The display unit 15 causes various displays to be presented on a display screen on the basis of instructions of the camera control unit 30. For example, the display unit 15 displays a playback image of image data read from a recording medium by the recording unit 14. Additionally, the display unit 15 is supplied with image data of the captured image whose resolution has been converted for display by the camera signal processing unit 13. The display unit 15 performs display on the basis of image data of the captured image in response to an instruction of the camera control unit 30, to display a so-called through image (subject monitoring image), which is an image captured during release standby.

Additionally, the display unit 15 causes various operation menus, icons, messages, and the like, that is, displays as a GUI (Graphical User Interface) to be presented on the screen on the basis of instructions of the camera control unit 30.

The output unit 16 performs data communication and network communication with an external device by wire or wirelessly.

For example, the output unit 16 transmits and outputs captured image data (still image file or moving image file) to an external display device, recording device, playback device, or the like.

Additionally, assuming that the output unit 16 is a network communication unit, it may communicate with various networks such as the Internet, a home network, and a local area network (LAN), and transmit and receive various data to and from a server, a terminal, and the like on the network.

The operation unit 17 collectively represents input devices for the user to perform various operation inputs. Specifically, the operation unit 17 represents various operators 110 (including shutter button 110S and assignable button 110C) provided in the main body housing 100.

The operation unit 17 detects the user's operation, and transmits a signal corresponding to the input operation to the camera control unit 30.

Not only the operator 110, but also a touch panel may be used as the operation unit 17. For example, various operations may be enabled by forming a touch panel on the display panel 101 and operating the touch panel using icons, menus, and the like to be displayed on the display panel 101.

Alternatively, the operation unit 17 may detect a user's tap operation or the like by using a touch pad or the like.

Further, the operation unit 17 may be a reception unit of an external operation device such as a separate remote controller.

The power supply unit 18 generates a power supply voltage Vcc required for each unit from a battery loaded inside, and supplies it as an operating voltage, for example.

When the lens barrel 2 is mounted on the imaging device 1, the power supply voltage Vcc of the power supply unit 18 is also supplied to a circuit inside the lens barrel 2.

Note that the power supply unit 18 may include a circuit for charging the battery or a circuit for generating the power supply voltage Vcc using, as the power supply, a DC voltage converted and input by an AC adapter connected to a commercial AC power supply.

The camera control unit 30 includes a microcomputer (arithmetic processing unit) including a central processing unit (CPU).

The memory unit 31 stores information or the like used for processing by the camera control unit 30. For example, the memory unit 31 illustrated in FIG. 4 comprehensively represents a read only memory (ROM), a random access memory (RAM), a flash memory, and the like.

The memory unit 31 may be a memory area built in a microcomputer chip as the camera control unit 30, or may be formed by a separate memory chip.

The camera control unit 30 controls the entire imaging device 1 and the lens barrel 2 by executing a program stored in the ROM, the flash memory, or the like of the memory unit 31.

For example, the camera control unit 30 controls the shutter speed of the image sensor 12, and controls operations of units necessary for giving an instruction on various signal processing by the camera signal processing unit 13, imaging and recording operations according to the user's operation, a playback operation of recorded image files, operations of the lens system 21 such as zoom, focus, aperture adjustment in the lens barrel 2, operations of the user interface, and the like. Regarding aperture adjustment, the camera control unit 30 performs variable control of the F value according to the user operation and an instruction of the F value as automatic control (auto iris).

The RAM in the memory unit 31 is used for temporarily storing data, programs, and the like as a work area for various data processing of the CPU of the camera control unit 30.

The ROM and flash memory (non-volatile memory) in the memory unit 31 are used for storing an operating system (OS) for the CPU to control units, content files such as image files, application programs for various operations, firmware, and the like.

When the lens barrel 2 is mounted on the main body housing 100, the camera control unit 30 communicates with the lens control unit 23 and gives various instructions.

The lens barrel 2 is equipped with the lens control unit 23 formed by a microcomputer, for example, and is capable of performing various data communication with the camera control unit 30. In the case of the present embodiment, the camera control unit 30 gives, to the lens control unit 23, a drive instruction of the zoom lens, the focus lens, the aperture mechanism, and the like. The lens control unit 23 controls the driver unit 22 in response to these drive instructions to perform the operation of the lens system 21.

Note that when the lens barrel 2 is mounted on the main body housing 100, wired communication is performed between the camera control unit 30 and the lens control unit 23. Note, however, that the camera control unit 30 and the lens control unit 23 may be capable of performing wireless communication.

For example, the driver unit 22 is provided with a motor driver for a zoom lens drive motor, a motor driver for a focus lens drive motor, a motor driver for an aperture mechanism motor, and the like.

These motor drivers apply a drive current to the corresponding driver in response to an instruction from the lens control unit 23 to move the focus lens or zoom lens, open and close the aperture blades of the aperture mechanism, or the like.

The operation unit 24 represents the operator 120 (including assignable button 120C) provided on the lens barrel 2 side. Operation information by the operation unit 24 is supplied to the lens control unit 23, and the camera control unit 30 is notified of the operation information through the lens control unit 23.

As a result, the lens control unit 23 can control the operation of the lens system 21 in response to the operation of the operator 120, and the camera control unit 30 can perform various settings and operation control in response to the operation of the operator 120, for example.

Note that similarly to the operation unit 17, the operation unit 24, too, is not limited to keys, dials, or the like, but may be a touch panel, a touch pad, a reception unit of a remote controller, or the like.

Figure 5:
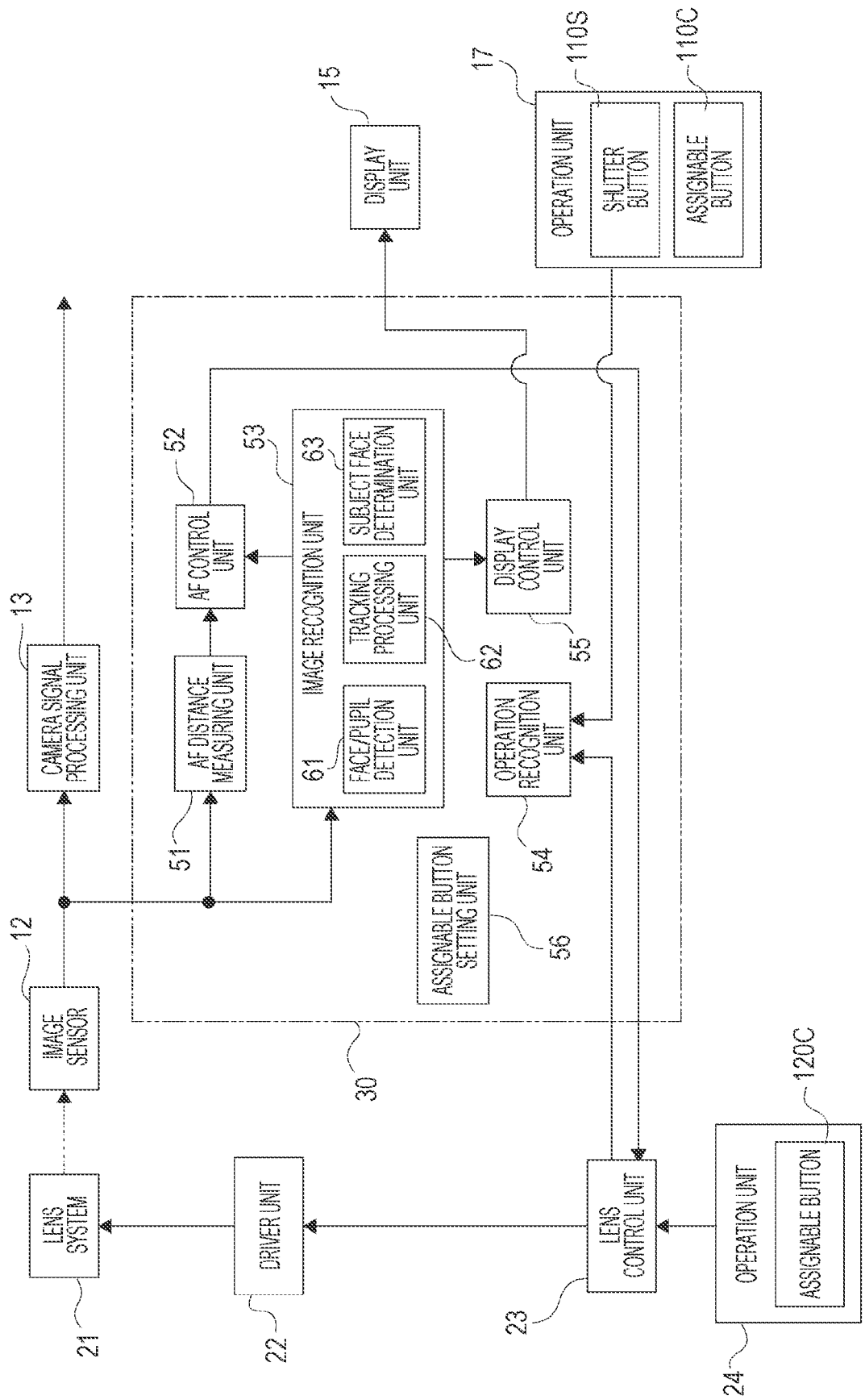
FIG. 5 is an explanatory diagram of a functional configuration of a camera control unit of the embodiment.

FIG. 5 extracts a part of the configuration of FIG. 4, and shows functions of the camera control unit 30 for performing the operation of the present embodiment.

Functions of the camera control unit 30 include an AF distance measuring unit 51, an AF control unit 52, an image recognition unit 53, an operation recognition unit 54, a display control unit 55, and an assignable button setting unit 56.

Note that while it is assumed that these functions are provided in the camera control unit 30 by software as an example in the description, some or all of these functions may be provided in a DSP or a microcomputer used as, for example, the camera signal processing unit 13 or the like, or may be provided in another part such as a microcomputer on a chip different from the camera control unit 30 and the camera signal processing unit 13, for example. In any case, it is only required to provide a configuration for performing these functions in the imaging device 1.

The AF distance measuring unit 51 performs distance measurement processing for autofocus. For example, using the captured image signal obtained by the image sensor 12, the AF distance measuring unit 51 performs operations for AF control as a so-called phase difference detection method, a contrast detection method, or a hybrid AF method having characteristics of both of these methods.

The AF control unit 52 generates an AF control signal on the basis of a control value obtained by the AF distance measuring unit 51, and performs processing to perform the AF operation. The AF control signal from the AF control unit 52 is transmitted to the lens control unit 23. Then, the lens control unit 23 controls the driver unit 22 on the basis of the AF control signal to drive the focus lens in the lens system 21, so that the AF operation is performed.

The image recognition unit 53 performs image analysis on the captured image signal obtained by the image sensor 12 and performs image content recognition processing. In particular, in the case of the present embodiment, recognition processing is performed as a face/pupil detection unit 61, a tracking processing unit 62, and a subject face determination unit 63, the face/pupil detection unit 61 performs processing of detecting the face or pupil of a person (or animal) as a subject within the frame of the captured image signal.

The tracking processing unit 62 performs processing for determining the position of and tracking the target subject within the frame of the captured image signal. Note that the target to be tracked is a subject on which AF is performed, for example. The user (image capturing person) selects the target by performing the operation of selecting the subject that is the target of AF, for example.

The subject face determination unit 63 determines the face of the subject. This is done by determining the area of a person's face within the frame, and further, performing processing for personal identification of the face. For example, when there are many people as subjects, it is assumed that processing such as recognition of target individual faces will also be performed.

The operation recognition unit 54 recognizes operations by the operation unit 17. The camera control unit 30 performs necessary control processing according to the user operation recognized by the operation recognition unit 54.

As operations particularly related to the processing of the embodiment, the operation recognition unit 54 recognizes operations of the shutter button 110S and the assignable button 110C by the operation unit 17 and operations of the assignable button 120C by the operation unit 24. In response to recognition of these operations, the AF distance measuring unit 51, AF control unit 52, and image recognition unit 53 described above perform corresponding processing.

The assignable button setting unit 56 represents a function of setting the operation functions of the assignable buttons 110C and 120C according to the user's setting operation.

As described above, in the present embodiment, it is assumed that the assignable buttons 110C and 120C are assigned the role of a tracking operation button.

When the operation recognition unit 54 detects the operation of the assignable button 110C or the assignable button 120C, the camera control unit 30 recognizes that a tracking operation has been performed on the basis of the setting of the assignable button setting unit 56.

The display control unit 55 controls the display operation of the display unit 15. For example, the display control unit 55 represents a function of performing control to cause a through image to be displayed, or to cause various operation menus, icons, messages, and the like to be displayed on the screen.

Figure 6:
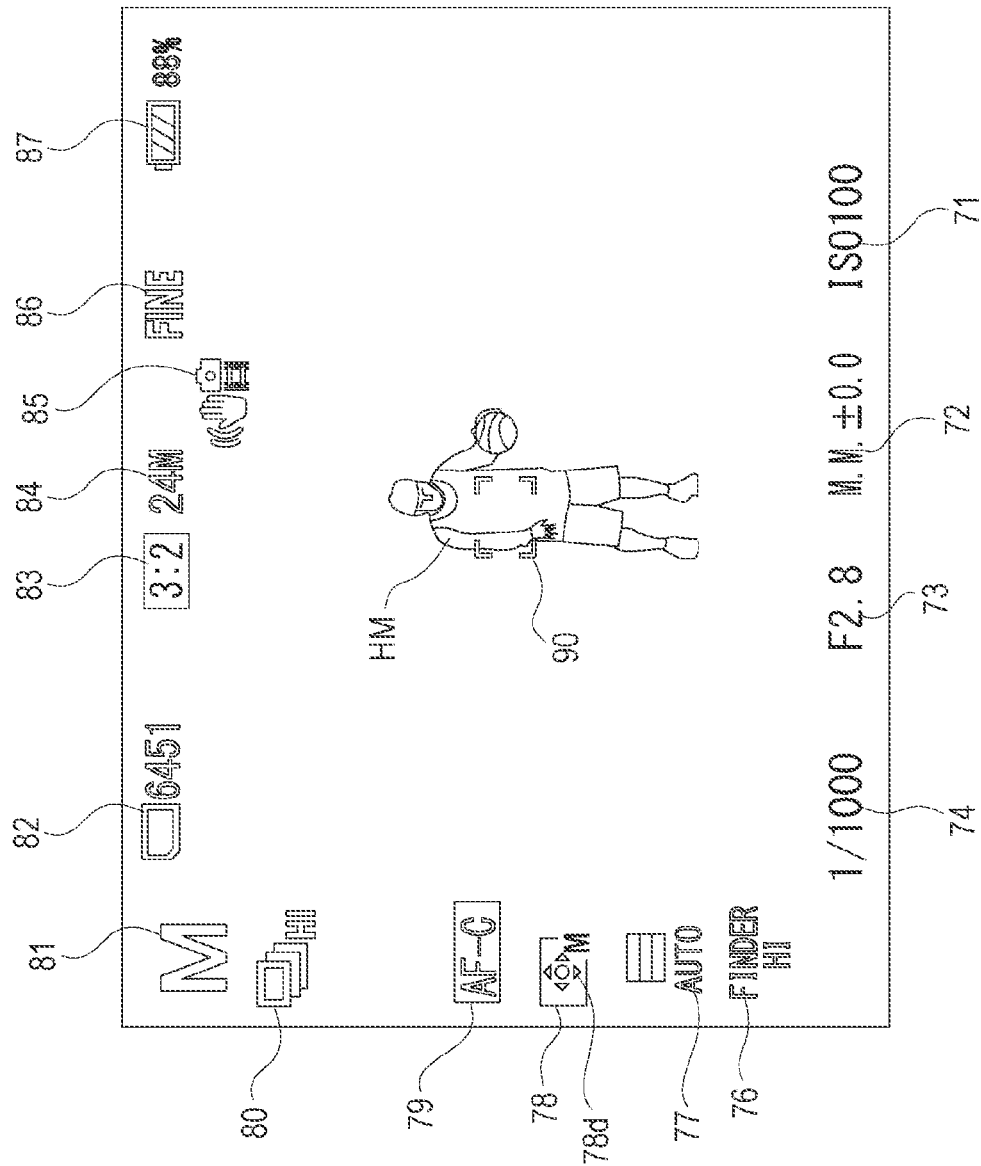
FIG. 6 is an explanatory diagram of a display example at the time of autofocus of the embodiment.
Figure 7:
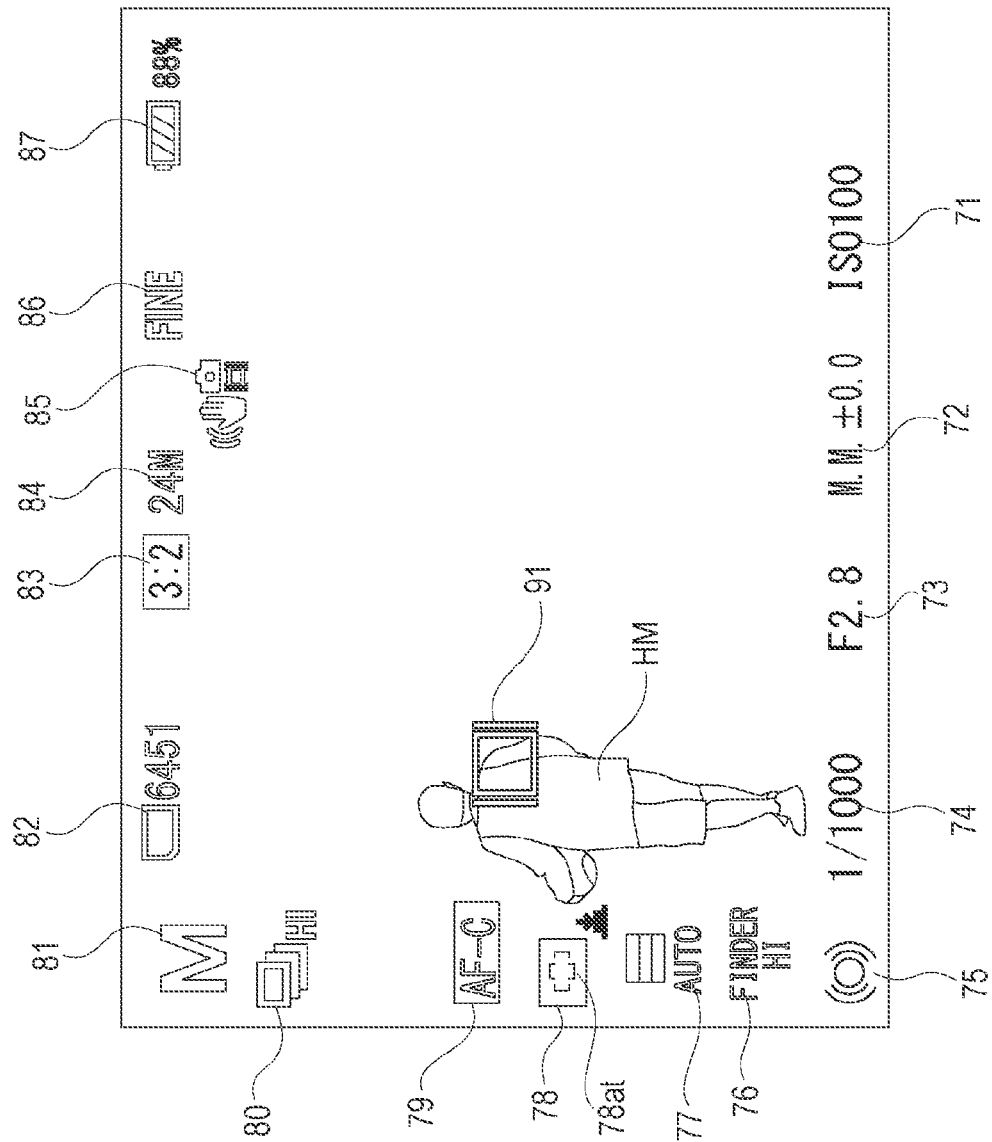
FIG. 7 is an explanatory diagram of a display example at the time of tracking of the embodiment.

FIGS. 6 and 7 show examples of display on the display unit 15. These are examples in which various icons are displayed so as to overlap a through image.

In FIG. 6, a person HM using a basketball is captured as a subject in the substantial center of a screen of the display unit 15 (i.e., angle of view of imaging).

Here, a focus frame 90 is displayed in the center of the screen. The focus frame 90 is a frame indicating the AF target, and is a frame indicating a so-called AF point.

The display position of the focus frame 90 changes depending on various modes, and there are cases where multiple focus frames 90 are displayed. Here, one focus frame 90 is displayed in the center of the screen as an example.

FIG. 7 shows a state in which tracking is performed. For example, suppose that AF is performed on the person HM on the basis of the focus frame 90 in FIG. 6, and the person HM is also targeted for tracking.

Suppose that at the time of FIG. 7, the person HM is located on the left side of the screen. A tracking frame 91 is displayed on this person HM. The tracking frame 91 follows the target subject and is displayed so as to overlap the subject.

Additionally, as shown in FIGS. 6 and 7, various icons and characters/numbers indicating the mode, operating state, and the like of the imaging device 1 are displayed on the screen.

For example, an ISO sensitivity 71, an exposure value 72, an aperture value 73, a shutter speed 74, and an in-focus mark 75 are displayed at the bottom of the screen.

The in-focus mark 75 indicates that the target is in focus, and in FIG. 7, it indicates that the tracking target is in focus.

On the left side of the screen, a viewfinder frame rate 76, a shutter method 77, a focus area 78, a focus mode 79, a drive mode 80, and an imaging mode 81 are displayed.

The viewfinder frame rate 76 is an icon indicating the frame rate of an image displayed on the viewfinder 102.

The shutter method 77 is an icon indicating mechanical shutter method, electronic shutter method, or auto. FIGS. 6 and 7 show auto, which indicates a mode in which the mechanical shutter method and the electronic shutter method are automatically switched according to the shooting conditions and the shutter speed.

The focus area 78 is an icon representing a focus area setting as an area for performing focus control. Focus area settings include "wide", "zone", "center", and "flexible spot". Examples of the icon indicating each focus area setting include icons 78a, 78b, 78c, and 78d shown in FIG. 8.

"Wide" is a focus area mode in which the focus is automatically adjusted with reference to the entire monitor as a through image, and is indicated by the icon 78a, for example.

"Zone" is a focus area mode in which when the position of the zone to be focused on the monitor is selected, the focus is automatically adjusted in the zone, and is indicated by the icon 78b, for example.

"Center" is a focus area mode in which a subject near the center of the monitor is automatically focused, and is indicated by the icon 78c, for example.

"Flexible spot" is a focus area mode in which the focus frame is moved to a desired place on the monitor to focus on a very small subject or a narrow area, and is indicated by the icon 78d, for example. In FIG. 6, the icon 78d is displayed as the focus area 78.

Note that in FIG. 7, an icon 78at is shown as the display of the focus area 78. This is the icon in a case where tracking AF is performed by half-pressing of the shutter button 110S and operating the assignable button 110C (or 120C) as described later. For example, this is an example of an icon when the tracking mode is set when the focus area setting is "wide". The tracking mode is a mode in which AF is performed while tracking a subject on which AF is performed.

Figure 8:
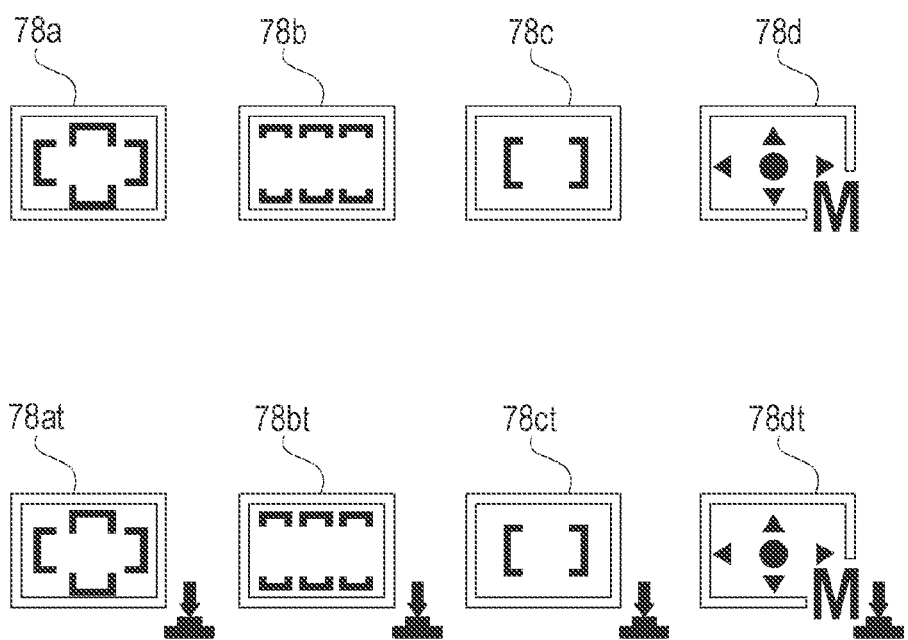
FIG. 8 is an explanatory diagram of focus area icons of the embodiment.

FIG. 8 shows icons 78at, 78bt, 78ct, and 78dt, which are examples of the icon when the tracking mode is set in each focus area setting.

Additionally, when the assignable button 110C (or 120C) is pressed while AF is performed by half-pressing, for example, one of these icons 78at, 78bt, 78ct, and 78dt is displayed.

Additionally, in a case where the assignable button 110C (or 120C) is pressed while half-pressing is not performed, the tracking mode is set. In that case, too, one of these icons 78at, 78bt, 78ct, and 78dt is displayed.

As described above, the icon of the focus area 78 is switched according to the focus area setting and the tracking mode at the time.

Note that the image examples of the icons displayed as the focus area 78 shown in FIGS. 6, 7, and 8 are examples used for the description, and the icons are not limited to these image designs.

The focus mode 79 displayed as shown in FIGS. 6 and 7 is an icon representing the AF operation mode. Examples of the AF operation mode include modes as single AF (AF-S) and continuous AF (AF-C).

Single AF is a mode in which autofocus works when the shutter button 110S is half-pressed, and once the subject is in focus, the focus is fixed there.

Continuous AF is a mode in which autofocus works and keeps focusing while the shutter button 110S is half-pressed. FIGS. 6 and 7 show an example in which the icon indicating continuous AF is displayed.

The drive mode 80 is an icon indicating single shot, continuous shooting, bracketing, and the like.

The imaging mode 81 is an icon indicating an imaging mode such as "program auto", "aperture priority", "shutter speed priority", "manual exposure", "moving image", or "slow/quick motion".

In FIGS. 6 and 7, a storage media/number 82, an aspect ratio 83, an image size 84, image stabilization 85, an image quality 86, and a battery level 87 are displayed at the top of the screen.

For example, the number of pictures saved and the number of pictures that can be saved on the recording medium are displayed as the storage media/number 82.

The aspect ratio 83 displays the aspect ratio of the captured image.

The image size 84 displays the size of the captured image.

The image stabilization 85 displays the on or off and mode of the image stabilization function.

The image quality 86 displays the image quality setting of the captured image.

The battery level 87 indicates the remaining battery level with a pictorial pattern and a percentage display, for example.

While various icons and the like displayed on the display unit 15 have been illustrated above, other icons, numbers, characters, or graphics for presenting various information are displayed on the display unit 15.

2. First Embodiment

An example of processing performed in the imaging device 1 having the above configuration will be described.

In the imaging device 1 of the embodiment, the AF operation is performed by half-pressing the shutter button 110S, for example. Additionally, the subject tracking operation function is assigned to a button (e.g., assignable button 110C or 120C) other than the AF operation button.

Then, in a first embodiment, the state in which the assignable button 110C or 120C is pressed is the tracking operation, and the state in which the pressing is canceled (user is not pressing button) is the tracking cancel operation.

Accordingly, tracking (tracking AF) is performed for the period while the assignable button 110C or 120C is pressed when the shutter button 110S is half-pressed.

Note that as described above, while the tracking operation button may be another button or another operator (lever, slide switch, dial, or the like) instead of the assignable buttons 110C and 120C, the following description of each embodiment is given on the assumption that the assignable button 110C is used. In the following description, operation of the assignable button 110C also corresponds to a case where tracking operation is performed as the assignable button 120C or another operator.

Generally, in a case where AF and tracking functions are provided, AF is performed at the same time as half-pressing the shutter so that subject tracking starts from the point of focus, for example.

Here, for example, in a situation where a runner who is a subject is running toward the camera from a distance in track and field, the general method of imaging is to perform only framing while focusing on the subject by half-pressing the shutter when the subject (runner) is still far away, and start imaging when the subject comes to a certain distance.

However, if AF and subject tracking start at the same time when the shutter is half-pressed, subject tracking will start when the subject is still far away and the subject on the screen is small. If this happens, the tracking image will deviate from the target position due to the small subject, or the image will include the background, and the subsequent tracking performance will be significantly reduced.

In the present embodiment, AF start and tracking start can be operated by different buttons.

That is, AF is performed by half-pressing of the shutter button 110S. Additionally, by pressing the assignable button 110C, the tracking mode is set and tracking processing is performed on the subject on which AF is performed.

With this method, for example, when the subject is far away, only AF is performed by half-pressing of the shutter button 110S, and tracking is started by the assignable button 110C after the subject approaches. If tracking is started after the subject approaches, unnecessary parts such as the background other than the subject are not included, and a good tracking result can be obtained. As a result, it is possible to perform imaging with high tracking performance.

Figure 9:
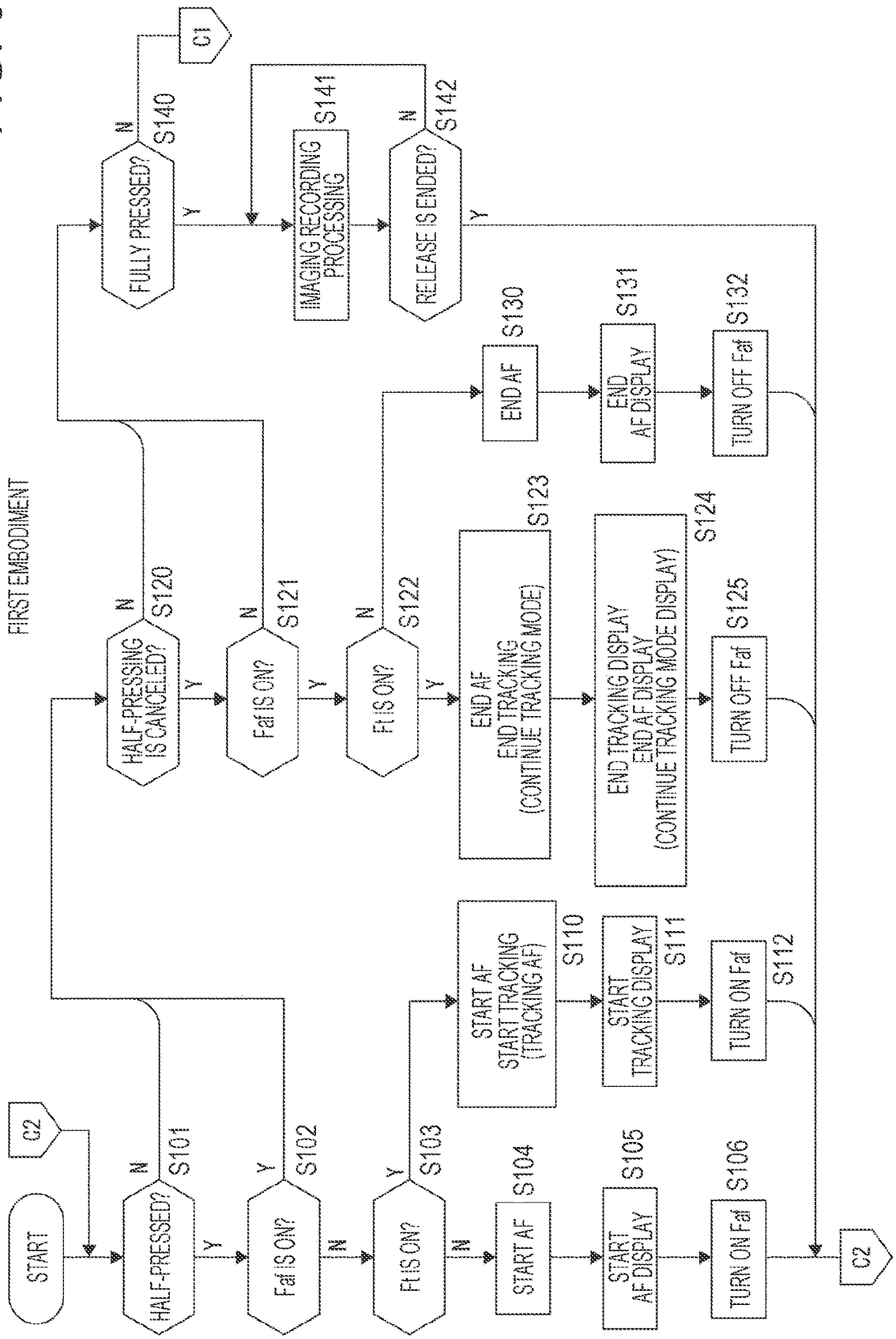
FIG. 9 is a flowchart of a processing example of a first embodiment.
Figure 10:
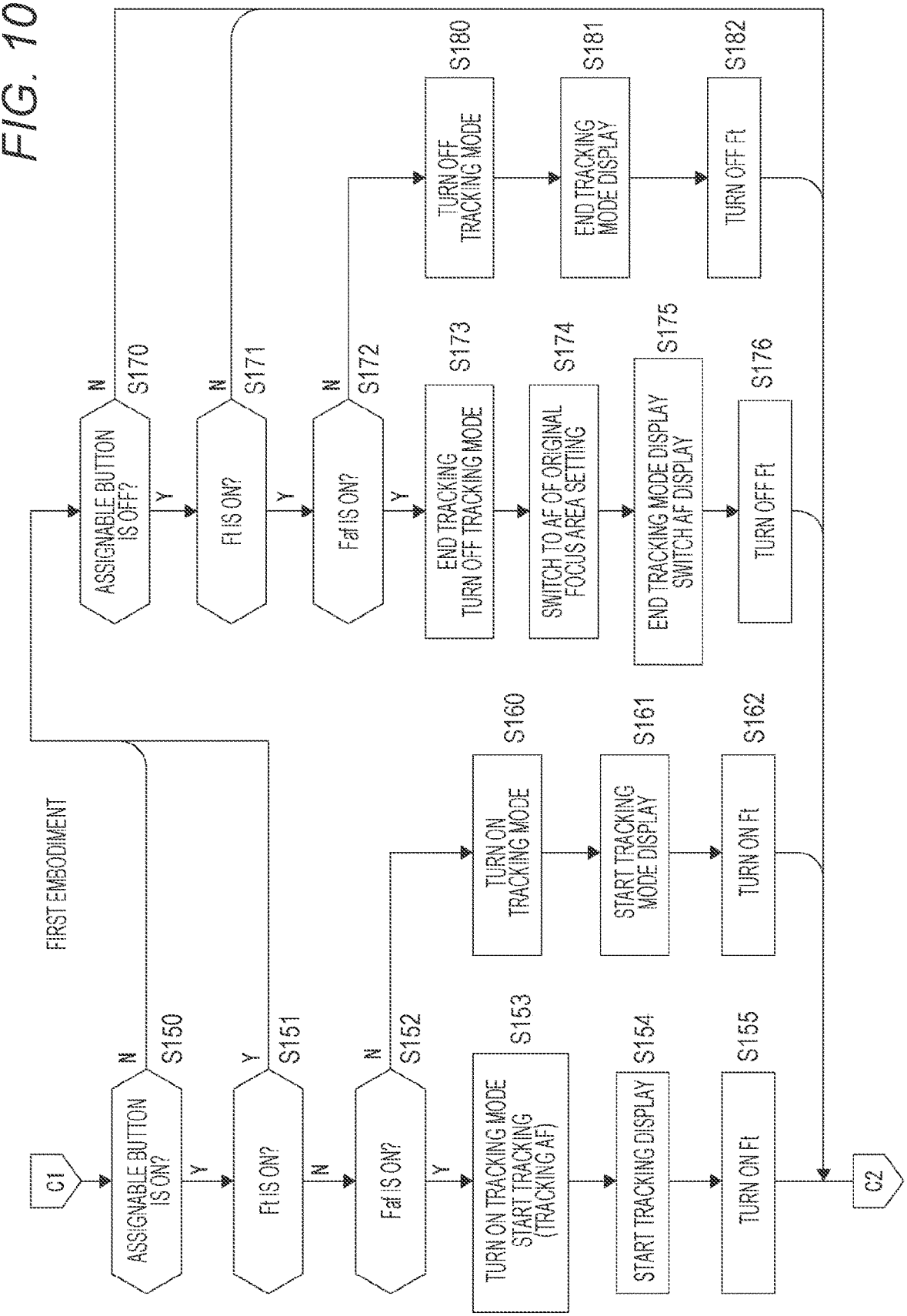
FIG. 10 is a flowchart of a processing example of the first embodiment.

FIGS. 9 and 10 show an example of processing as the first embodiment. This processing is performed by the camera control unit 30 by the functions shown in FIG. 5. Note that the processing of FIGS. 9 and 10 are continuous at parts indicated by symbols "C1" and "C2".

Then, FIGS. 9 and 10 show the processing of the camera control unit 30 in response to operations of the shutter button 110S and the assignable button 110C.

The camera control unit 30 monitors operations of the shutter button 110S and the assignable button 110C by repeating the processing of steps S101, S120, S140, S150, and S170 of FIGS. 9 and 10 as an operation detection loop.

Upon detection of half-pressing of the shutter button 110S by the user, the camera control unit 30 advances the processing from step S101 to step S102, and confirms whether or not a flag Faf is on.

The flag Faf is a flag indicating whether or not AF is currently being performed. For the sake of explanation, it is assumed that the flag Faf is turned on while AF is being performed and the flag Faf is turned off when AF is not being performed, for example.

The flag Faf being turned off in this step S102 means that it is a timing when the shutter button 110S is half-pressed.

Hence, if the flag Faf is off in step S102, the camera control unit 30 proceeds to step S103 and confirms whether or not a flag Ft is turned on.

The flag Ft is a flag indicating whether or not a tracking mode that activates a function of tracking a target is set. For the sake of explanation, it is assumed that the flag Ft is turned on when the tracking mode is set and the flag Ft is turned off when the tracking mode is not set, for example. The on or off of the tracking mode corresponds to whether or not the assignable button 110C is pressed. That is, as described later, the tracking mode is turned on when the assignable button 110C is pressed, and the tracking mode is turned off when the assignable button 110C is not pressed.

For example, when the user simply half-presses the shutter button 110S without pressing the assignable button 110C, the flag Faf is still off and the flag Ft is also off, so the camera control unit 30 proceeds to step S104 and starts AF. That is, the AF operation by the AF distance measuring unit 51 and the AF control unit 52 is started.

Additionally, in step S105, along with the start of AF, the camera control unit 30 also changes the display on the display unit 15 to a display corresponding to the AF operation. That is, as display control processing of the display control unit 55, the focus frame 90 is displayed according to the focus area setting at that time, and the display is switched to show necessary icons, for example.

Then, in step S106, the camera control unit 30 turns on the flag Faf along with the start of AF, and returns to the operation detection loop.

Continued half-pressing of the shutter button 110S by the user causes the processing of the camera control unit 30 to proceed from step S101 to S102 repeatedly. However, since the flag Faf is turned on after the start of AF, the camera control unit 30 proceeds from step S102 to step S120, and continues processing of the operation detection loop.

That is, the camera control unit 30 monitors the operation of the shutter button 110S and the assignable button 110C while continuing the AF control.

Additionally, there may be a case where half-pressing of the shutter button 110S is detected when the assignable button 110C is pressed and the tracking mode is turned on (step S162 described later). That is, this is a case where the shutter button 110S is half-pressed and the assignable button 110C is pressed at the same time.

In such a case, the camera control unit 30 proceeds to step S110 because the flag Ft is on in step S103.

In this case, the camera control unit 30 starts AF and also starts tracking processing. Specifically, the AF operation by the AF distance measuring unit 51 and the AF control unit 52 is started. In this case, since the tracking mode is turned on (step S160 described later), AF is performed on the subject to be tracked. Then, when the subject is in focus, the tracking processing is started by the function of the image recognition unit 53, targeting the focused subject. For example, subject recognition by functions of the face/pupil detection unit 61 and the subject face determination unit 63 and the tracking function of the tracking processing unit 62 for the subject are activated. Then, for each frame of the captured image signal obtained from the image sensor 12, the target subject detects the position in the image frame, and AF is performed on the position of the subject to be tracked. In this way, the tracking AF operation is started.

In step S111, along with the start of the tracking AF operation, the camera control unit 30 also changes the display on the display unit 15 to a display corresponding to the tracking AF operation. That is, as display control processing of the display control unit 55, the tracking frame 91 is superimposed on the subject to be tracked, and the display is switched to show necessary icons, for example.

Then, the camera control unit 30 turns on the flag Faf in step S112 and returns to the operation detection loop.

When it is detected that half-pressing of the shutter button 110S is canceled (button is turned off), that is, during a period when the shutter button 110S is not operated, the camera control unit 30 proceeds from step S120 to step S121 and confirms whether or not the flag Faf is on. If the flag Faf is off and AF control is not being performed, the state where the shutter button 110S is not half-pressed is simply continued, so the processing proceeds to step S140 and returns to the monitoring loop.

A case where the flag Faf is on in step S121 is when half-pressing of the shutter button 110S is immediately canceled from a state where the half-pressing had been performed.

That is, when the user stops the half-pressing, the camera control unit 30 proceeds to step S122, confirms the flag Ft at that time, and confirms whether or not the tracking mode is set.

A case where the flag Ft is off here is when the assignable button 110C had not been pressed and AF had been performed by half-pressing of the shutter button 110S.

In that case, the camera control unit 30 proceeds to step S130, ends the AF control, and performs display control according to the end of the AF control in step S131.

Then, the camera control unit 30 turns off the flag Faf in step S132 and returns to the operation detection loop.

On the other hand, a case where the flag Ft is on in step S122 is when only half-pressing of the shutter button 110S is canceled from a state where pressing of the assignable button 110C and half-pressing of the shutter button 110S had been performed at the same time to perform tracking AF.

In that case, the camera control unit 30 proceeds to step S123 and ends both the tracking processing and the AF control. The reason for ending the tracking processing is that tracking targets the subject focused by AF, and is premised on the execution of AF. Note, however, that since the tracking operation by the assignable button 110C is continued, the tracking mode is maintained.

In step S124, the camera control unit 30 performs control to end the display related to tracking (e.g., tracking frame 91), end the display according to the end of the AF control, and change the icons, for example. The display indicating the tracking mode is continued.

Additionally, the camera control unit 30 turns off the flag Faf in step S125 and returns to the operation detection loop.

Upon detection of full-pressing of the shutter button 110S, that is, a shutter operation (release operation), the camera control unit 30 proceeds from steps S140 to S141 to perform imaging recording processing. That is, the camera control unit 30 processes the captured image signal of one frame obtained according to the release operation timing as still image data, and instructs the camera signal processing unit 13 to record the still image data. As a result, one still image is captured and recorded in the recording unit 14.

Note that in normal imaging, the release operation is performed by pressing the shutter button 110S once, and one still image is captured, which causes the camera control unit 30 to determine that the release is ended in step S142. In that case, the camera control unit 30 determines that the release is ended even if the user keeps pressing the button fully. Then, the processing returns to the operation detection loop.

On the other hand, in a case where the imaging mode is the continuous shooting mode, with full-pressing of the shutter button 110S by the user, the camera control unit 30 performs control so that multiple still images are recorded. For this reason, until the limit number of continuous shots is reached, if the full-pressing is continued, the processing returns to step S141 from step S142, and still image capturing and recording is repeated. Then, when the full-press operation is canceled or the limit number of continuous shots is reached, the release ends, the processing at the time of the release operation is ended, and the processing returns to the operation detection loop from step S142.

When the operation (pressing) of the assignable button 110C is detected as the tracking operation, the camera control unit 30 proceeds from step S150 to step S151 in FIG. 10 to confirm the flag Ft.

The flag Ft being turned off here means that it is a timing when the assignable button 110C, which had not been pressed, is pressed.

In that case, the camera control unit 30 proceeds to step S152, and causes the processing to branch depending on whether the flag Faf is on or off, that is, whether the shutter button 110S is half-pressed or not when the assignable button 110C is pressed.

If the assignable button 110C is pressed while the shutter button 110S is half-pressed, the camera control unit 30 proceeds from step S152 to S153. In this case, the camera control unit 30 turns on the tracking mode in step S153 and starts the tracking AF processing. That is, the camera control unit 30 starts tracking the subject that had been the AF target, and continuously performs AF control on the tracked subject.

In step S154, the camera control unit 30 performs display control so that the tracking frame 91 or the like is displayed or a predetermined icon is displayed, for example, in response to the start of tracking AF.

Then, in step S155, the camera control unit 30 turns on the flag Ft and returns to the operation detection loop.

There may be a case where the flag Faf is off at step S152. That is, a case where the assignable button 110C is pressed with no half-pressing of the shutter button 110S.

In this case, the camera control unit 30 proceeds from step S152 to S160 to turn on the tracking mode. The tracking mode is a mode for tracking an AF target subject, but since AF is not performed at this point, tracking AF does not start. Accordingly, in this case, tracking of the subject is started when AF is performed.

In step S161, the camera control unit 30 performs display control according to the tracking mode. For example, the display of the focus area 78 in FIG. 6 is switched to an icon indicating the tracking mode (e.g., one of icons 78*at*, 78*bt*, 78*ct*, and 78*dt*).

Then, in step S162, the camera control unit 30 turns on the flag Ft and returns to the operation detection loop.

Note that when the tracking mode is set in this way, thereafter half-pressing the shutter button 110S causes the camera control unit 30 to start tracking AF in step S110 of FIG. 9.

In this first embodiment, the period in which the assignable button 110C is pressed is set to the tracking mode. Accordingly, during the period in which the assignable button 110C is pressed, the processing proceeds from step S150 to step S151 in the operation detection loop. Note, however, that since a case where the flag Ft is on in step S151 is when the tracking mode is already set, the processing proceeds directly to step S170 and returns to the operation detection loop.

When the assignable button 110C is not pressed or after the operation (pressing) of the assignable button 110C is ended as tracking cancel, the camera control unit 30 proceeds from step S170 to step S171 and confirms the flag Ft.

The flag Ft being turned on here means that it is a timing when pressing of the assignable button 110C, which had been continued, is canceled.

In that case, the camera control unit 30 proceeds to step S172, and causes the processing to branch depending on whether the flag Faf is on or off, that is, whether the shutter button 110S is half-pressed or not when the pressing of the assignable button 110C is ended.

A case where the flag Faf is on in step S172 is when tracking AF is performed until the time of tracking cancel, and the operation of only the assignable button 110C is ended.

In this case, the camera control unit 30 proceeds from step S172 to S173, ends the tracking processing, and turns off the tracking mode.

Since an instruction on the AF operation is still given, the camera control unit 30 returns to the AF operation state according to the original focus area setting in step S174.

Additionally, in step S175, the camera control unit 30 performs display control so that the display of the tracking frame 91 or the like is ended or the displayed icon is switched, for example, in response to the end of the tracking mode.

Then, in step S176, the camera control unit 30 turns off the flag Ft and returns to the operation detection loop.

That is, the tracking AF operation returns to the AF operation based on the original focus area setting.

There may be a case where the flag Faf is off at step S172. That is, a case where the assignable button 110C had been pressed with no half-pressing of the shutter button 110S, and then the pressing of the assignable button 110C is ended. That is, a case where the tracking mode is turned on in the processing of step S160.

In this case, the camera control unit 30 proceeds from step S172 to S180 to turn off the tracking mode. Then, in step S181, the camera control unit 30 performs display control according to the end of the tracking mode. For example, the display of the focus area 78 in FIG. 6 is switched to an icon that is not the tracking mode (e.g., one of icons 78a, 78b, 78c, and 78d).

Then, in step S182, the camera control unit 30 turns off the flag Ft and returns to the operation detection loop.

During this period in which the assignable button 110C is not pressed, the operation detection loop will proceed from step S170 to S171 every time. However, after the tracking mode is already canceled as described above, the flag Ft is off at step S171.

In that case, the processing returns to the operation detection loop from step S171.

As shown in FIGS. 9 and 10 above, when the camera control unit 30 performs processing corresponding to the shutter button 110S and the assignable button 110C, actions corresponding to operations of various patterns as shown in FIG. 11 are performed.

FIG. 11 shows patterns P1, P2, P3, and P4 as operation procedures for the shutter button 110S and the assignable button 110C.

Each pattern is a variation of the order of "half-pressing" and "half-pressing cancel" of the shutter button 110S, and "tracking operation" and "tracking cancel" by the assignable button 110C.

An example of the operation procedure corresponding to pattern P1 and the action transition of the imaging device 1 according to the operation procedure are shown as the following (a1) to (a10), and the corresponding steps in the processing of FIGS. 9 and 10 in that case are shown.

Note that the following shows an example in which full-pressing (release operation) of the shutter button 110S is also performed during the operation process.
 (a1) Half-pressing (step 1) is performed.
 (a2) AF is started (S104).
 (a3) Tracking operation (step 2) is performed.
 (a4) Subject tracking is started from the point of focus (S153).
 (a5) AF is performed while tracking the subject (S153).
 (a6) Still image capture and recording is performed according to a release operation (S141).
 (a7) Tracking is canceled (step 3)
 (a8) Tracking is ended and the tracking mode is ended, and then AF is continued with the original focus area setting (S173, S174).
 (a9) Half-pressing is canceled (step 4).
 (a10) AF is ended (S130).

The operation procedure corresponding to pattern P2 and the action transition of the imaging device 1 according to the operation procedure are shown by the following (b1) to (b10).
 (b1) Half-pressing (step 1) is performed.
 (b2) AF is started (S104).
 (b3) Tracking operation (step 2) is performed.
 (b4) Subject tracking starts from the point of focus (S153).
 (b5) AF is performed while tracking the subject (S153).
 (b6) Still image capture and recording is performed according to a release operation (S141).
 (b7) Half-pressing is canceled (step 3)
 (b8) Tracking AF is ended, but the tracking mode is maintained (S123).
 (b9) Tracking is canceled (step 4).
 (b10) The tracking mode is ended (S180).

The operation procedure corresponding to pattern P3 and the action transition of the imaging device 1 according to the operation procedure are shown by the following (c1) to (c10).
 (c1) Tracking operation (step 1) is performed.
 (c2) The tracking mode is started (S160).
 (c3) Half-pressing (step 2) is performed.
 (c4) After focusing, subject tracking is started (S110).
 (c5) AF is performed while tracking the subject (S110).
 (c6) Still image capture and recording is performed according to a release operation (S141).
 (c7) Half-pressing is canceled (step 3)
 (c8) Tracking AF is ended, but the tracking mode is maintained (S123).
 (c9) Tracking is canceled (step 4).
 (c10) The racking mode is ended (S180).

The operation procedure corresponding to pattern P4 and the action transition of the imaging device 1 according to the operation procedure are shown by the following (d1) to (d10).
 (d1) Tracking operation (step 1) is performed.
 (d2) The tracking mode is started (S160).
 (d3) Half-pressing (step 2) is performed.
 (d4) After focusing, subject tracking is started (S110).
 (d5) AF is performed while tracking the subject (S110).
 (d6) Still image capture and recording is performed according to a release operation (S141).
 (d7) Tracking is canceled (step 3).
 (d8) Tracking is ended and the tracking mode is ended, and then AF is continued with the original focus area setting (S173, S174).
 (d9) Half-pressing is canceled (step 4).
 (d10) AF is ended (S130).

While the above patterns P1, P2, P3, and P4 are examples, in this way, with half-pressing and cancellation of half-pressing of the shutter button 110S and the tracking operation and tracking cancellation by the assignable button 110C, the user can flexibly start and end AF and tracking depending on the situation.

Subsequently, examples of displaying icons as the focus frame 90, the tracking frame 91, and the focus area 78 will be described.

For example, of the procedure of pattern P1 described above, FIGS. 12A, 12B, and 12C show icons of the focus frame 90, the tracking frame 91, and the focus area 78 for each of the cases of: first, when AF is performed by half-pressing (a2), next, when tracking AF is performed by a tracking operation (a5), and then, when tracking is canceled and AF is performed (a8).

Figure 12A:
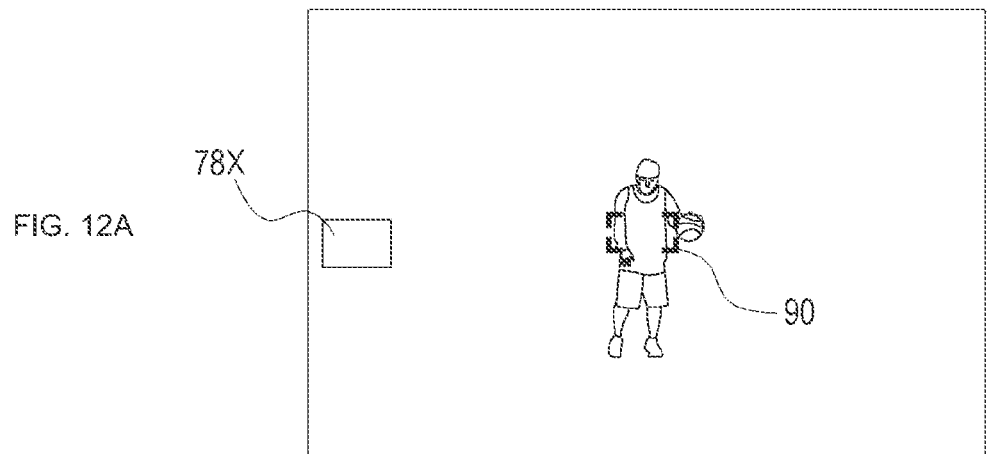
FIGS. 12A, 12B, and 12C are explanatory diagrams of a focus frame display example of the embodiment.

By half-pressing of the shutter button 110S, the focus frame 90 is displayed on the display unit 15 as shown in FIG. 12A, and it is shown that AF is performed on the subject of the focus frame 90. For example, in a case where the focus area setting is "center", the focus frame 90 is displayed in the center of the monitor screen as shown in FIG. 12A.

As the display of the focus area 78, an icon 78X corresponding to the focus area setting of the AF operation is displayed.

Note that the icon 78X is an icon displayed when the tracking mode is not set, such as the icons 78a, 78b, 78c, and 78d in FIG. 8.

Figure 12B:
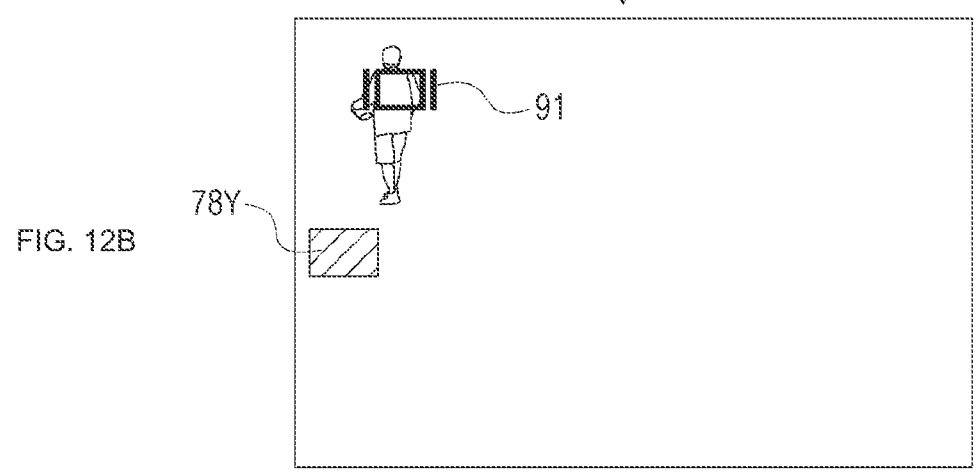

After the tracking AF is started, the focus frame 90 is eliminated as shown in FIG. 12B, and the tracking frame 91 is displayed instead at the position of the target subject being tracked. The tracking frame 91 is changed according to a change in the position of the target subject in the screen. It is also shown that AF is performed on the subject of the tracking frame 91.

As the display of the focus area 78, an icon 78Y corresponding to the tracking mode is displayed.

Note that the icon 78Y is an icon displayed during the tracking mode, such as the icons 78at, 78bt, 78ct, and 78dt in FIG. 8.

Figure 12C:
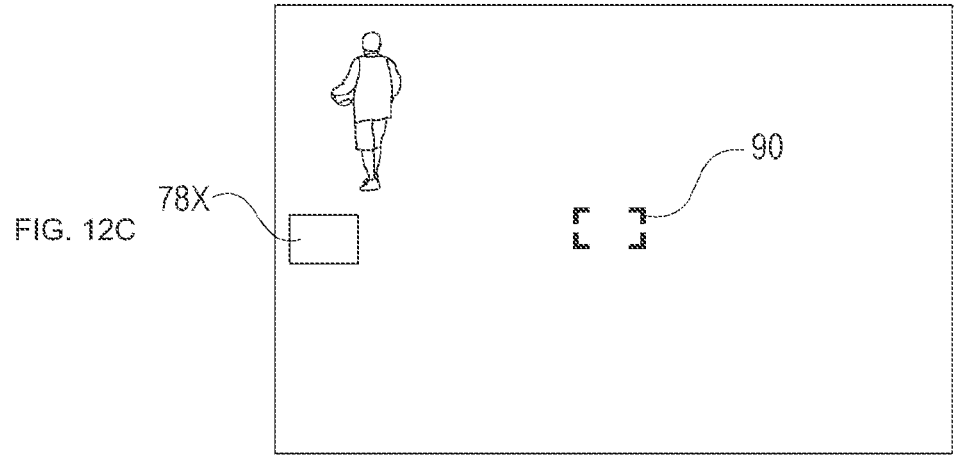

Thereafter, when the tracking is canceled, normal AF is resumed, and the focus frame 90 is displayed again as shown in FIG. 12C. The focus frame 90 is displayed according to the original focus area setting. For example, if the focus area setting was "center" before the start of tracking AF, the focus frame 90 is displayed in the center of the monitor screen as shown in FIG. 12C.

That is, by turning off the assignable button 110C, the user recognizes that the state where the tracking frame 91 changes its position according to the subject returns to the original AF state where only half-pressing is performed.

The display of the focus area 78 also returns to the icon 78X corresponding to the focus area setting of the AF operation.

Figure 13A:
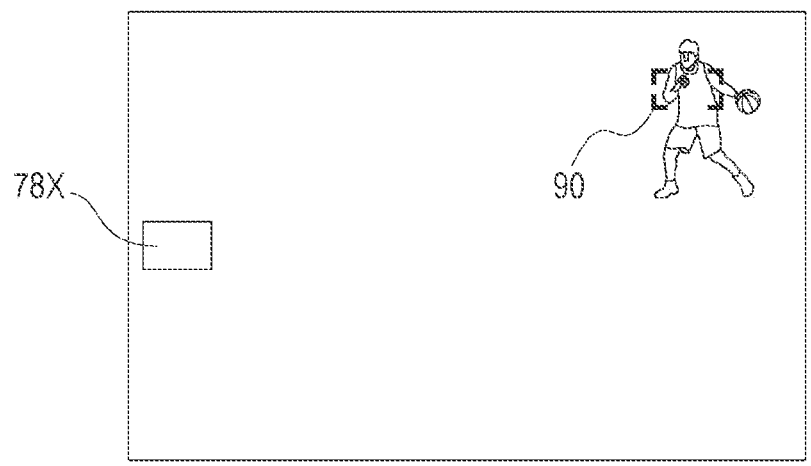
FIGS. 13A, 13B, and 13C are explanatory diagrams of a focus frame display example of the embodiment.
Figure 13B:
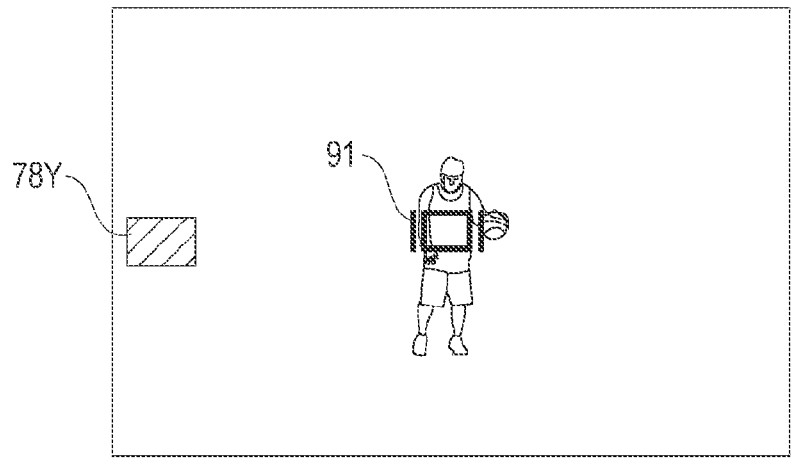
Figure 13C:
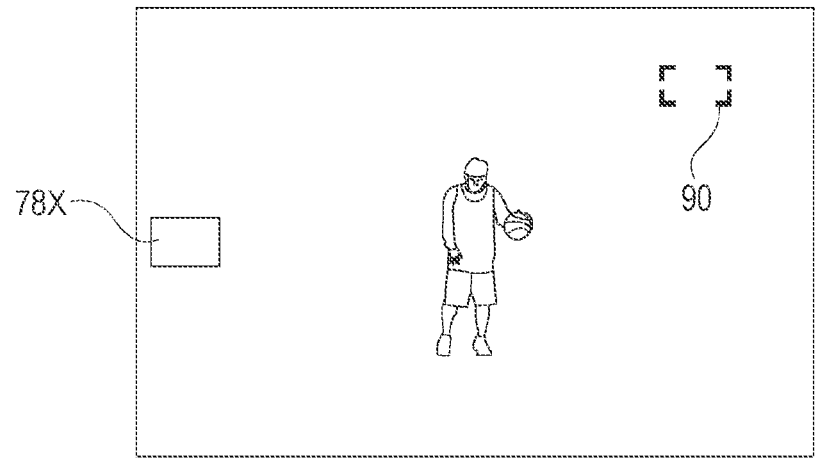

In addition, FIGS. 13A, 13B, and 13C similarly show icons of the focus frame 90, the tracking frame 91, and the focus area 78, taking as an example the time when the operation is performed according to the procedure in the above pattern P1. This is a case where, for example, the focus area setting is flexible spot, and the tracking operation is performed when the focus frame 90 is at a position other than the center.

In a case where AF is performed by half-pressing of the shutter button 110S, assume that the focus frame 90 is displayed at a position other than the center of the monitor screen as shown in FIG. 13A.

As the display of the focus area 78, an icon 78X corresponding to the focus area setting of the AF operation is displayed.

After the tracking AF is started, the focus frame 90 is eliminated as shown in FIG. 13B, and the tracking frame 91 is displayed instead at the position of the target subject being tracked.

As the display of the focus area 78, an icon 78Y corresponding to the tracking mode is displayed.

Thereafter, when the tracking is canceled, normal AF is resumed, and the focus frame 90 is displayed again at the original position (position before start of tracking AF) as shown in FIG. 13C.

The display of the focus area 78 returns to the icon 78X.

The display transitions illustrated in FIGS. 12A, 12B, and 12C, and FIGS. 13A, 13B, and 13C, are advantageous in that the user can easily recognize that the original focus area setting before the start of tracking AF is resumed when the tracking AF is ended, and the user can smoothly move on to the next imaging after the end of the tracking.

Figure 14A:
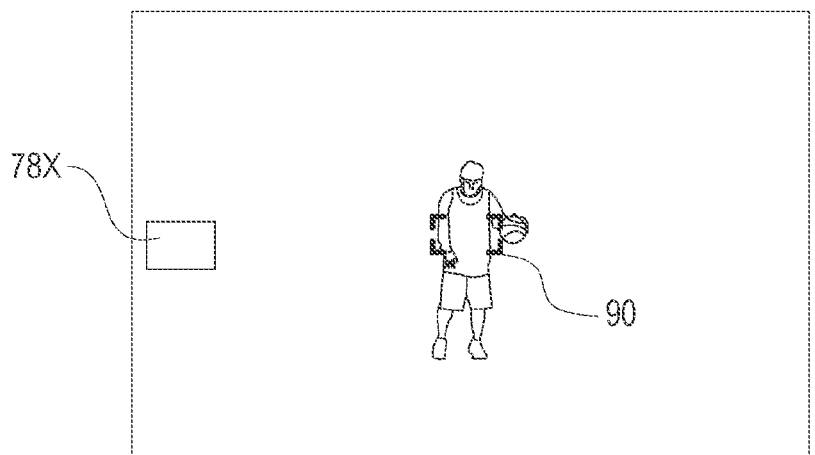
FIGS. 14A, 14B, and 14C are explanatory diagrams of a focus frame display example of the embodiment.
Figure 14B:
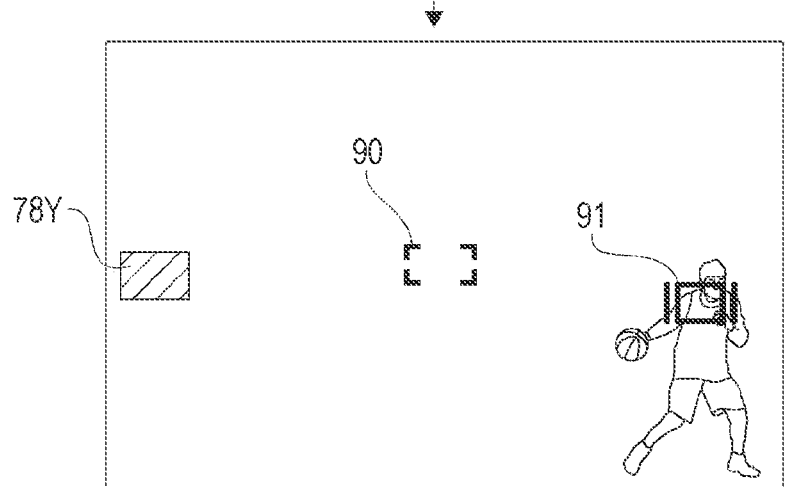
Figure 14C:
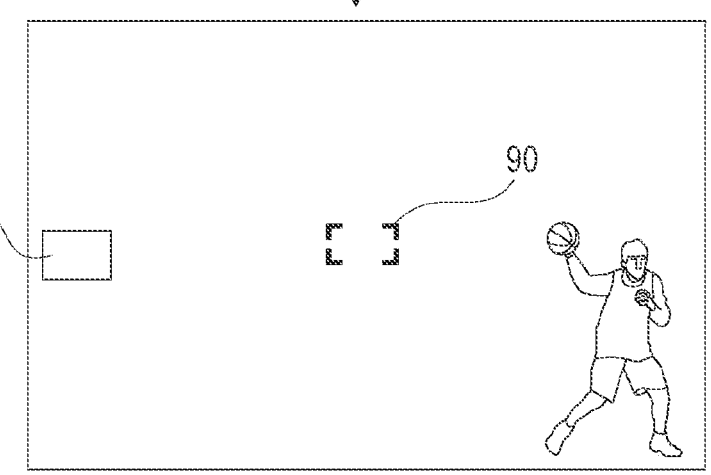

Next, FIGS. 14A, 14B, and 14C show an example of continuing the display of the focus frame 90. Here, an example is shown where the focus area setting is "center".

In a case where AF is performed by half-pressing of the shutter button 110S, assume that the focus frame 90 is displayed as shown in FIG. 14A. The display of the focus area 78 is the icon 78X.

After the tracking AF is started, the tracking frame 91 is displayed at the position of the target subject being tracked as shown in FIG. 14B. In this case, the focus frame 90 is still displayed in the original position (position before start of tracking AF). The display of the focus area 78 is switched to the icon 78Y.

Thereafter, when the tracking is canceled, normal AF is resumed as shown in FIG. 14C. That is, the display of the tracking frame 91 disappears. The focus frame 90 continues to be displayed as it is. The display of the focus area 78 returns to the icon 78X.

When displaying as shown in FIGS. 14A, 14B, and 14C, the user can recognize the original focus frame 90 even during tracking. For this reason, even when the tracking is canceled, it is possible to immediately prepare for the next imaging target.

Next, FIGS. 15A, 15B, and 15C show an example in which the focus frame 90 is once returned to a fixed position when tracking AF is ended. Here, the fixed position is the center of the screen.

In a case where AF is performed by half-pressing of the shutter button 110S, assume that the focus frame 90 is displayed according to the focus area setting which is flexible spot, for example, as shown in FIG. 15A. The display of the focus area 78 is the icon 78X.

After the tracking AF is started, the focus frame 90 is eliminated as shown in FIG. 15B, and the tracking frame 91 is displayed at the position of the target subject being tracked. The display of the focus area 78 is switched to the icon 78Y.

Thereafter, when the tracking is canceled, the tracking frame 91 is eliminated and the focus frame 90 is displayed, and the focus frame 90 is displayed in the center of the screen set as a fixed position as shown in FIG. 15C. That is, the position to which the focus frame 90 returns is not the original position before the start of tracking AF as shown in FIGS. 12A, 12B, 12C, 13A, 13B, and 13C above. The display of the focus area 78 returns to the icon 78X.

When displaying as shown in FIGS. 15A, 15B, and 15C, the focus frame 90 always returns to a fixed position such as the center when tracking is canceled. By knowing this, it is easier to prepare for the next imaging target.

Note that the fixed position is not limited to the center, and may be another position such as a center slightly to the right or a center slightly to the left, or a position arbitrarily specified by the user.

In the above examples, the display control of FIGS. 12A, 13A, 14A, and 15A, that is, the display of the focus frame 90 and the like when the shutter button 110S is half-pressed, is based on the processing of step S105 of FIG. 9.

Additionally, the display control of FIGS. 12B, 13B, 14B, and 15B, that is, the display of the tracking frame 91 and the like after the start of tracking AF, is based on the processing of step S154 of FIG. 10. Note that the same applies in a case where the processing of step S111 in FIG. 9 is performed.

Additionally, the display control of FIGS. 12C, 13C, 14C, and 15C, that is, the display when AF is performed after the end of tracking AF, is based on the processing of step S175 of FIG. 10.

Other than these, there is a case where half-pressing of the shutter button 110S is canceled and the assignable button 110C is pressed, that is, where AF is off and the tracking mode is maintained. In that case, the tracking mode is displayed in step S124 of FIG. 9 or step S161 of FIG. 10. For example, one of the tracking mode icons 78*at*, 78*bt*, 78*ct*, and 78*dt* is displayed in the focus area 78. In this case, display of the focus frame 90 and the tracking frame 91 may be omitted, or one or both of them may be displayed.

Additionally, when half-pressing of the shutter button 110S is canceled and the tracking by the assignable button 110C is also canceled, the focus frame 90 and the tracking frame 91 are not displayed due to the processing of step S131 of FIG. 9 or step S181 of FIG. 10. The display of the focus area 78 is set to the icon 78X corresponding to the focus area setting at that time. Additionally, even in such a case, the focus frame 90 may be continuously displayed.

3. Second Embodiment

Processing and a display example of a second embodiment will be described with reference to FIGS. 16, 17A, 17B, and 17C.

This second embodiment is still another example related to the display of the focus frame 90 as shown in FIGS. 12A, 12B, 12C, 13A, 13B, 13C, 14A, 14B, 14C 15A, 15B, and 15C described above.

Figure 16:
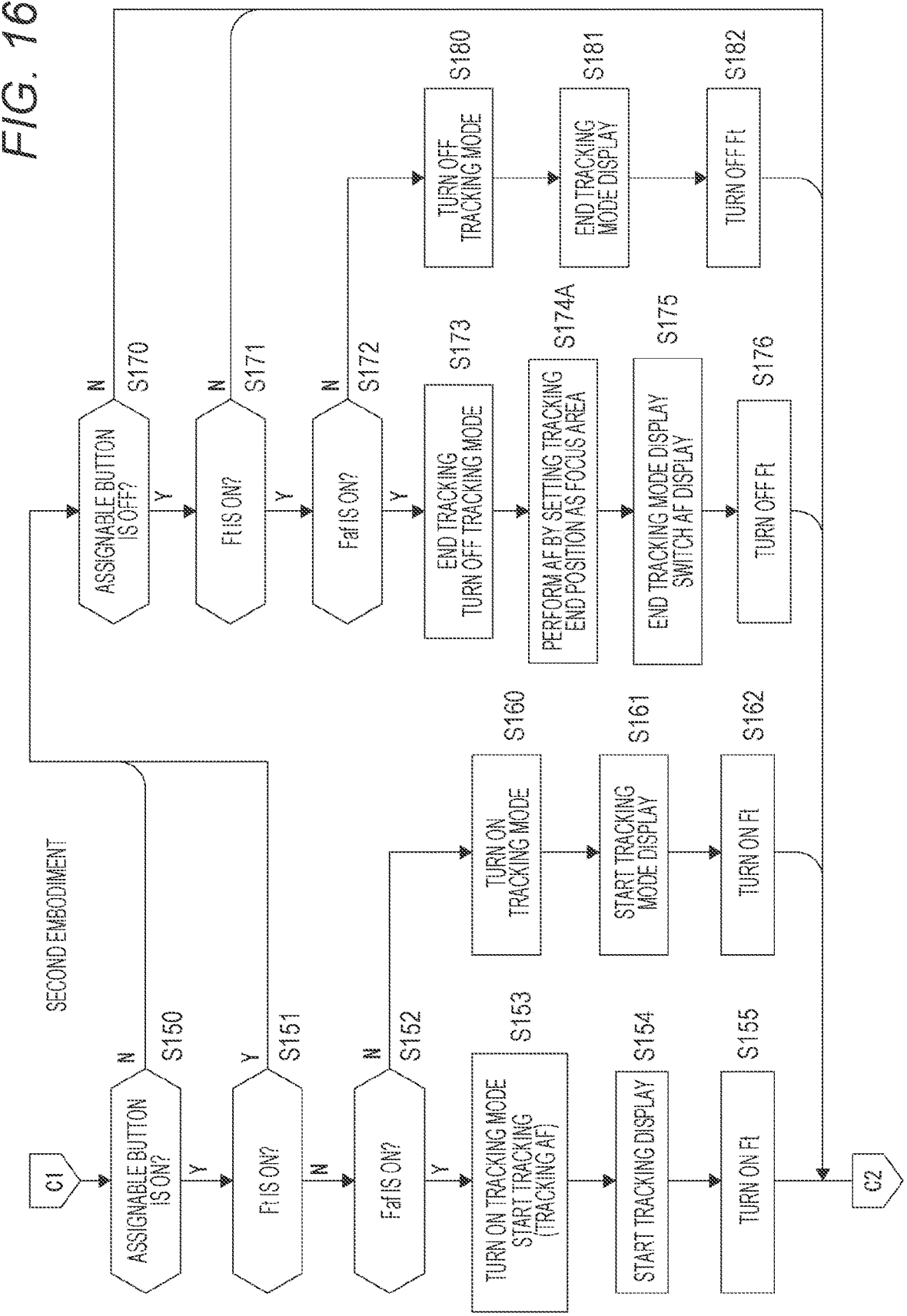
FIG. 16 is a flowchart of a processing example of a second embodiment.

Note that while FIG. 16 shows a processing example of a camera control unit 30, this replaces FIG. 10 as processing following FIG. 9 above. That is, the processing shown in FIGS. 9 and 16 are the processing example of the second embodiment.

Additionally, in FIG. 16, the same processing as in FIG. 10 is assigned the same step number and the description thereof will be omitted. The difference is that step S174 in FIG. 10 is replaced with step S174A in FIG. 16.

Step S174A indicates the display control when tracking AF is ended by an assignable button 110C as tracking cancel, but half-pressing of a shutter button 110S is continued.

In this case, the camera control unit 30 causes AF to be performed by setting the tracking end position as the focus area. That is, the camera control unit 30 displays a focus frame 90 at the position where a tracking frame 91 had been displayed, and performs AF control on the subject of the focus frame 90.

Figure 17A:
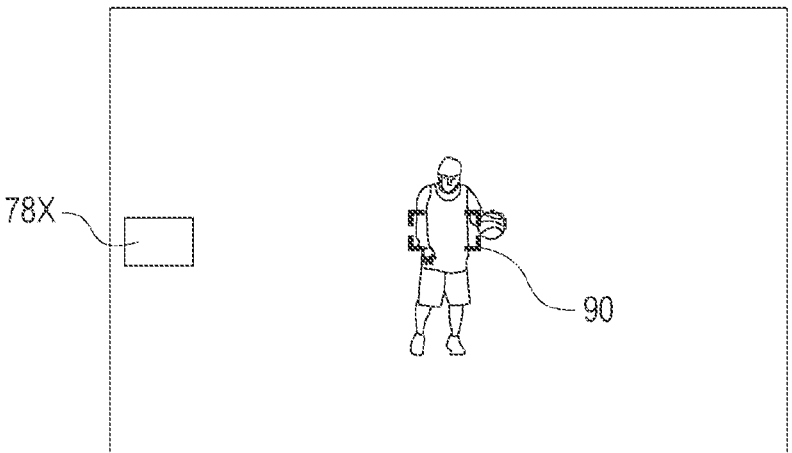
FIGS. 17A, 17B, and 17C are explanatory diagrams of a focus frame display example of the second embodiment.
Figure 17B:
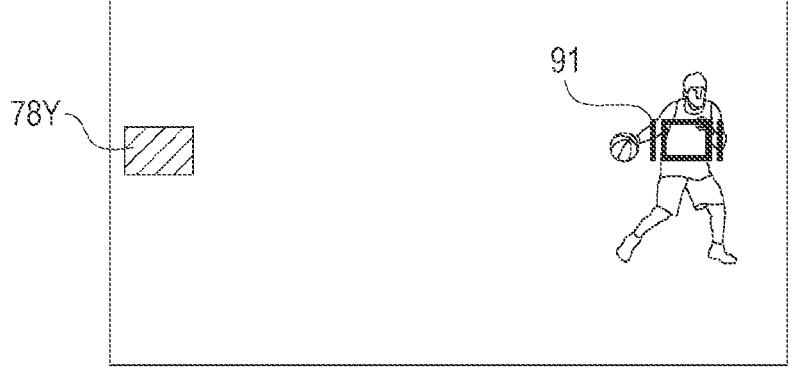
Figure 17C:

A display example is shown in FIGS. 17A, 17B, and 17C.

In a case where AF is performed by half-pressing the shutter button 110S, assume that the focus frame 90 is displayed as shown in FIG. 17A. The display of the focus area 78 is the icon 78X.

After the tracking AF is started, the focus frame 90 is eliminated as shown in FIG. 17B, and the tracking frame 91 is displayed at the position of the target subject being tracked. The display of the focus area 78 is switched to the icon 78Y.

Thereafter, when the tracking is canceled, the tracking frame 91 is erased and the focus frame 90 is displayed, and the focus frame 90 is in the position at the end of tracking, that is, the position where the tracking frame 91 was displayed at the end of tracking, as shown in FIG. 17C.

The display of the focus area 78 returns to the icon 78X.

When displaying as shown in FIGS. 17A, 17B, and 17C, the focus frame 90 maintains the tracking position when the tracking is canceled. Hence, by knowing this, it is easier for the user to prepare for the next imaging target.

The technology is also useful when the user desires to move the focus frame 90 on the monitor screen. This is because AF can be newly applied at the tracking end position.

4. Third Embodiment

Figure 18:
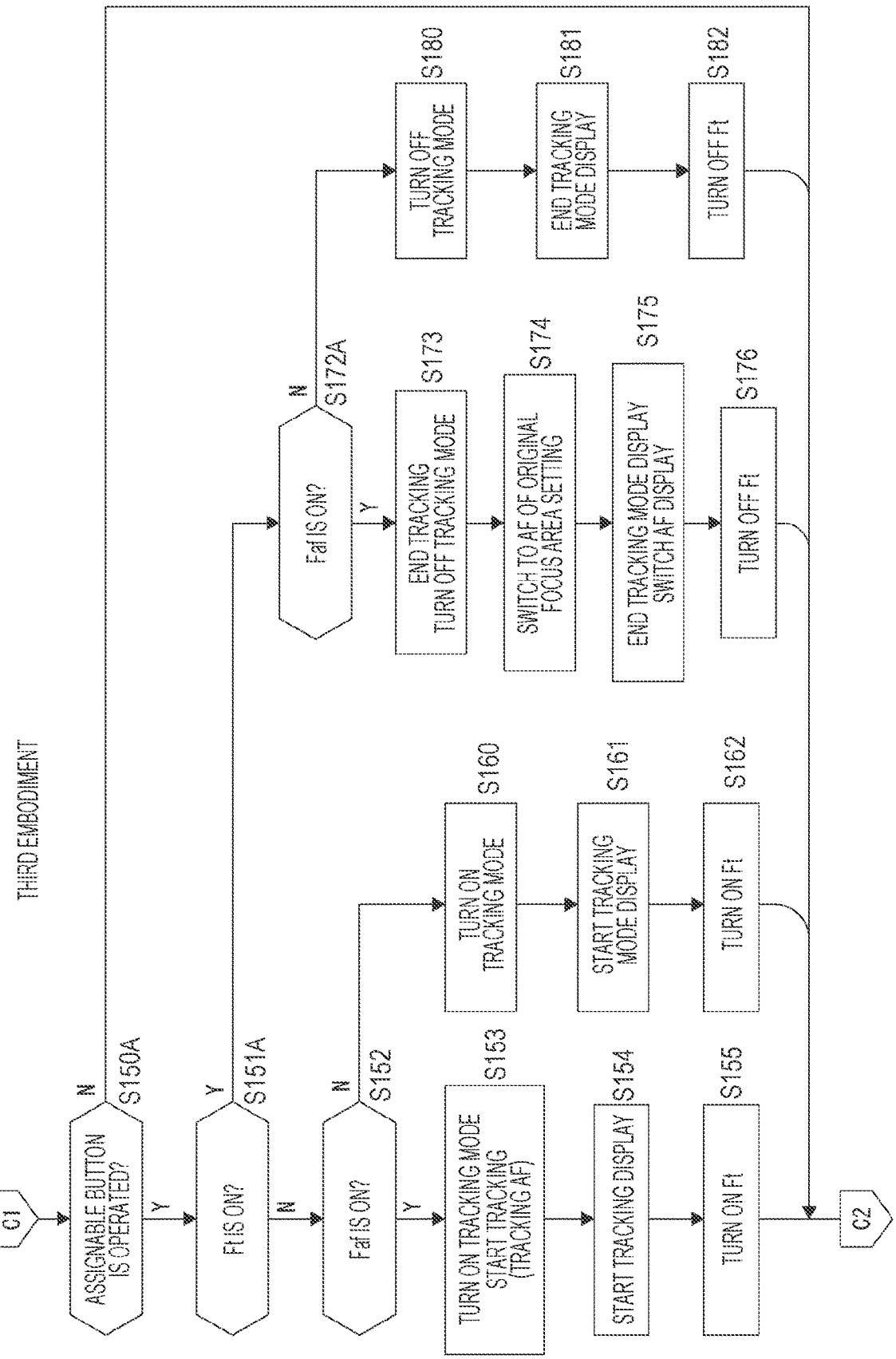
FIG. 18 is a flowchart of a processing example of a third embodiment.

A processing example of a camera control unit 30 as a third embodiment will be described with reference to FIG. 18. FIG. 18 replaces FIG. 10 as processing following FIG. 9 above. That is, the processing shown in FIGS. 9 and 18 are the processing example of the third embodiment.

Additionally, in FIG. 18, the same processing as in FIG. 10 is assigned the same step number and the description thereof will be omitted.

The third embodiment is an example in which an assignable button 110C is a toggle operation type button. That is, it is an example in which a tracking operation is performed by pressing the assignable button 110C once and the tracking is canceled by pressing the assignable button 110C again.

In FIG. 18 following the processing of FIG. 9, a camera control unit 30 confirms whether or not the assignable button 110C has been operated as step S150A in an operation detection loop. This is processing of recognizing one operation as a so-called single press.

When the single press of the assignable button 110C is detected, the camera control unit 30 proceeds to step S151A and confirms whether or not a flag Ft is on. That is, it is a confirmation of whether or not the tracking mode had been performed set to that point.

If the tracking mode had not been set up to that point, the camera control unit 30 determines that the detected operation of the assignable button 110C is an operation by the user as a tracking operation.

In this case, the camera control unit 30 proceeds to step S152 to confirm whether or not a flag Faf is on, and if it is on, half-pressing of the shutter button 110S is also performed, so the processing of steps S153, S154, and S155 is performed. That is, tracking AF is started, display control according to tracking AF is started, and the flag Ft is turned on.

On the other hand, if the flag Ft is not on in step S152, half-pressing of the shutter button 110S is not performed, so the camera control unit 30 performs processing of steps S160, S161, and S162. That is, the tracking mode is set, the display of the tracking mode is started, and the flag Ft is turned on.

A case where the operation of the assignable button 110C is detected and the flag Ft is determined to be on in step S151A is when tracking AF had been performed or the tracking mode is set.

Hence, the camera control unit 30 proceeds to step S172A and confirms whether or not the flag Faf is on.

If the flag Faf is on, it means that tracking cancel is detected from a state in which tracking AF had been performed. Hence, the camera control unit 30 performs the processing of steps S173, S174, S175, and S176. That is, the tracking AF is ended, the tracking mode is also turned off, the AF control is switched to the original focus area setting, the display control according to the AF control is started, and the flag Ft is turned off.

On the other hand, if the flag Faf is off, it means that a tracking cancel operation is detected from a state in which AF had not been performed and the tracking mode had been set. Hence, the camera control unit 30 performs the processing of steps S180, S181, and S182. That is, the tracking mode is also turned off, the display control is started accordingly, and the flag Ft is turned off.

With the processing described above, the tracking operation and the tracking cancel may be sequentially performed by the toggle operation of the assignable button 110C.

5. Summary and Modification

According to the above embodiments, the following effects can be obtained.

The imaging device 1 of the embodiment includes the AF control unit 52 that performs AF control in response to detection of half-pressing of the shutter button 110S, for example, as an AF operation (first operation), and the tracking processing unit 62 that performs tracking processing for a subject to be focused in response to detection of a tracking operation (second operation) using the assignable button 110C, for example, that is an operator different from the shutter button 110S in a state where the AF control is performed in response to the half-pressing.

In such an imaging device 1, the timing of starting AF control and the timing of starting tracking processing can be controlled by the user's will. Then, by performing an appropriate operation according to the object to be imaged and the situation, it is possible to expand the possibility of performing desirable imaging and imaging without missing an imaging opportunity, for example.

In particular, by operating the shutter button 110S and assignable button 110C (or 120C), tracking AF is performed with the AF target as the tracking target. Hence, while AF and tracking can be performed by different operations, tracking AF operation having a common target subject can also be performed, and good operability can be provided.

Tracking processing is performed on a certain subject after the subject is focused on. Hence, if AF control and tracking processing are started at the same time, for example, in a case where a subject that is difficult to focus on is targeted (e.g., distant subject, small subject, or the like), an unintended subject may be focused on, and tracking is likely to be activated.

For example, in the case of capturing an image of a subject approaching from a distance, such as the marathon runner approaching from a distance as described above, even if AF control and tracking processing are started while the subject is far away, the image for tracking tends to include objects other than the subject. In that case, when the subject approaches, the tracking frame 91 may gradually deviate from what the image capturing person wanted to track.

For this reason, if AF control and tracking processing are performed in one operation, situations where focus control and tracking of the target subject cannot be performed properly tend to occur. Then, during that time, it is difficult to capture an image with the target subject in focus, or it is more likely to miss an imaging opportunity.

According to the processing of the embodiment, the image capturing person can first start an AF operation by a half-pressing operation, focus on the target subject, and select an appropriate timing to start tracking AF by a tracking operation. This makes it easier to properly capture the target subject and makes it easier to obtain a desired captured image. That is, an effect of facilitating advanced imaging by the imaging device 1 using tracking can be obtained.

By tracking the subject with high accuracy, it is possible to take many in-focus photographs in continuous shooting. That is, by starting tracking by aiming at a certain part after the subject becomes large in the state of performing AF, it becomes easier to take continuously shot images in which the part is in focus.

Additionally, in a camera equipped with a full-size image sensor, for example, if a telephoto lens with a bright aperture value is used, the depth of field is shallow. Hence, in such a situation, the subject will be blurred and framing cannot be performed unless AF is performed continuously to maintain the focus. For this reason, it is normal to half-press the shutter button 110S to perform framing while performing AF. Even with such a model, it is particularly preferable that the AF operation does not start tracking of the subject at the same time.

Additionally, the imaging device 1 includes a first operator for performing an AF operation and a second operator for performing a tracking operation. That is, the AF operation is performed by half-pressing of the shutter button 110S, and the tracking instruction is performed by operating the assignable button 110C (or 120C). By providing separate operators in this way, the operation becomes clear, and usability is improved.

Note that as a modified example, it is also conceivable to provide an operator to which a subject tracking and AF start function is assigned as another button (e.g., focus hold button attached to lens) different from the AF operator (e.g., shutter button 110S).

It is also conceivable to assign a tracking operation function to an operator such as a foot switch or a remote controller.

Additionally, the first operator and the second operator are not limited to those using buttons, levers, dials, or the like, and touch panels, touch pads, or the like may also be used as the first operator or the second operator.

Additionally, it is also conceivable to use an imaging unit, a sensor unit, a microphone, or the like for detecting a user's gesture operation or a voice device as a first operator or a second operator.

Additionally, while the description has been given assuming still image capturing, the technology of the embodiment can also be applied to the case of moving image capturing.

In the embodiment, the camera control unit 30 (AF control unit 52) controls the focus on the subject to be tracked in response to the tracking processing being performed by the tracking operation in the state where AF control is performed in response to the half-pressing (step S153 in FIG. 10).

By changing AF control from targeting an area to focusing on the subject that is the tracking target as tracking AF, it is possible to set a suitable situation for imaging the tracking target. That is, by waiting for a chance while performing the half-press operation and the tracking operation (operation of assignable button 110C or 120C) and then performing a shutter operation, it becomes easy for the user to perform high-quality imaging.

In the embodiment, control is performed to change the display on the display unit indicating the operating state, depending on whether it is a first state where AF control is performed in response to half-pressing and tracking processing is not performed, or it is a second state where tracking processing and focus control on the subject to be tracked are performed (tracking AF) in response to half-pressing and tracking. Specifically, the camera control unit 30 (display control unit 55) switches the display icon of the focus area 78 between the icon 78X and the icon 78Y for the period when only AF control is performed and the period when tracking and tracking AF are performed (see FIGS. 12A, 12B, 12C, 13A, 13B, 13C, 14A, 14B, 14C, 15A, 15B, 15C. 17A, 17B, and 17C).

As a result, the user can grasp from the display the state in which AF control is performed and tracking is not performed, and the state in which tracking and tracking AF of performing AF control on the subject to be tracked are performed. Hence, it becomes easy to understand the action state according to the operation.

In the embodiment, for example, the display panel 101, the viewfinder 102, or the display unit 15 of an external display device or the like displays the focus frame 90 according to the AF control and the tracking frame 91 according to the tracking operation. That is, the camera control unit 30 (display control unit 55) that controls the display operation of the display unit 15 causes the focus frame 90 indicating the focusing area to be displayed in a predetermined position when it is the first state where AF control is performed in response to half-pressing and tracking processing is not performed. Moreover, in the second state where the tracking processing and the focus control on the subject to be tracked are performed in response to the tracking operation, the tracking frame 91 is displayed at the position of the subject image to be tracked (see FIGS. 12A, 12B, 12C, 13A, 13B, 13C, 14A, 14B, 14C, 15A, 15B, 15C, 17A, 17B, and 17C).

This makes it easier for the user to understand the operating state by the first operation (half-pressing of shutter button 110S) and the second operation (operation of assignable button 110C).

The first embodiment shows an example in which, when it is the second state where tracking AF is performed as shown in FIGS. 14A, 14B, and 14C, the display operation of the display unit 15 is controlled so that the tracking frame 91 is displayed while maintaining the display of the focus frame 90 in the immediately preceding first state.

Although the original AF control is resumed when the tracking is canceled, by leaving the display of the original focus frame 90, the user can grasp, during the tracking AF, the AF area after the original AF control is resumed. Accordingly, even if the tracking is interrupted, the user can easily deal with the situation.

The first embodiment describes an example in which, when the second state where tracking AF is performed transitions to the first state where AF control is performed without tracking, the camera control unit 30 (AF control unit 52) starts the AF control before the start of the tracking operation in the immediately preceding second state, and the camera control unit 30 (display control unit 55) ends the display of the tracking frame 91, and causes the focus frame 90 to be displayed in the state before the start of tracking.

For example, as shown in FIGS. 12A, 12B, 12C, 13A, 13B, and 13C, the focus frame 90 is eliminated and the tracking frame 91 is displayed during the period of tracking AF, and when the tracking is ended thereafter, the focus frame 90 is displayed in the original state.

As a result, the user can grasp that the AF operation is being continued when only the tracking operation is canceled (when assignable button 110C is turned off by continuous operation or when assignable button 110C is pressed again by toggle operation). In addition, since the focus frame 90 is displayed at the original position, the user can accurately recognize that the AF operation is performed with the focus area setting before tracking, which is useful for subsequent operations.

For example, if the subject to be tracked goes out of frame or out of focus and proper tracking is interrupted, the original AF state can be resumed by canceling the tracking operation with the assignable button 110C. This means that tracking can be easily restored from an inappropriate state. For example, when continuous shooting had been performed while tracking, if the tracking is interrupted, a blurred image with an inappropriate focus state will be captured and recorded, but by returning to the original AF state, continuous shooting can be performed in the original AF state. This increases the possibility that imaging can be continued without missing an imaging opportunity even if tracking is interrupted.

The second embodiment describes an example in which, when the second state where tracking AF is performed transitions to the first state where AF control is performed without tracking, the camera control unit 30 (AF control unit 52) starts to perform AF control on an area based on the position of the tracking frame 91 at the end of tracking, the camera control unit 30 (display control unit 55) ends the display of the tracking frame 91, and causes the focus frame 90 to be displayed in the position of the tracking frame 91 at the end of tracking.

For example, as described in FIGS. 16, 17A, 17B, and 17C, if tracking AF is ended but half-pressing of the shutter button 110S is continued, AF control is performed at the end position of the tracking.

As a result, the user can continue AF control in the area that he/she was focusing attention on by the tracking frame 91, so that the focus state can be easily grasped, which is useful for the subsequent imaging operation.

This also provides the user with an operation that can be applied in a case where the user desires to change the AF control area.

For example, when the user pans the imaging device 1 with the tracking and tracking AF started by performing the tracking operation with the assignable button 110C or the like after performing AF control on the target subject by half-pressing of the shutter button 110S, the position of the target subject moves on the screen, and the AF area also moves. If the tracking operation is canceled in that state, AF control will be performed at the position after the movement. This is a very convenient method when the user desires to perform AF control at an arbitrary position on the image.

The first embodiment describes an example in which, when transitioning from the second state to the first state, the camera control unit 30 (AF control unit 52) starts AF control for a fixed area of the captured image, and the camera control unit 30 (display control unit 55) ends the display of the tracking frame 91 and causes the focus frame 90 to be displayed in the fixed area of the captured image.

For example, as shown in FIGS. 15A, 15B, and 15C, even if the focus area setting is not originally the center area, when only tracking is ended, AF control is started and the focus frame 90 is displayed by setting the focus area setting to the center.

As a result, the position that is focused on is always the same when the tracking cancel operation is performed to end the tracking. Accordingly, it becomes easier for the user to understand the focus area when the tracking AF is canceled, and it becomes easier to perform subsequent imaging.

This, too, increases the possibility that imaging can be continued without missing an imaging opportunity when tracking is interrupted. This is because when the tracking is interrupted and the tracking is stopped, the focus area can be understood immediately, and at least the center of the image is in focus.

Note that the fixed region does not necessarily have to be the center of the captured image (center of frame). For example, it is conceivable that the user selects a fixed area and AF control is performed in the fixed area set by the user at the end of tracking.

It is also conceivable that the AF control area is returned to a fixed area such as the center in this way only when tracking is canceled from the tracking AF. For example, in a case where the focus area is normally set as wide, zone, flexible spot, or the like, when the half-pressing of the shutter button 110S is canceled after returning to the fixed area and then half-pressing is performed again, AF may be performed on the basis of the focus area setting. With this processing, it is possible to perform AF control in the center only when the half-pressing is not canceled even if tracking and tracking AF are stopped, so that the operation can be easily understood and the user's focus area setting can be utilized.

The embodiment describes an example in which the focus area setting in AF control is set to target the subject to be tracked when a tracking operation is detected with no detection of half-pressing. The focus area setting for the subject to be tracked is a setting for moving the AF control target according to the position of the subject to be tracked. That is, the tracking mode is set only by the tracking operation.

The patterns P3 and P4 of FIG. 11 illustrate cases where the assignable button 110C is operated with no half-pressing of the shutter button 110S. This is the case when the tracking operation is detected with no detection of half-pressing. In this case, the focus area setting is the setting of tracking AF in which the autofocus control target is moved according to the position of the subject to be tracked. As a result, the tracking AF setting operation can be performed in advance before the shutter button 110S is half-pressed.

In the embodiment, the camera control unit 30 (display control unit 55) performs display corresponding to the fact that the focus area setting in AF control has been set to target the subject to be tracked when a tracking operation is detected with no detection of half-pressing.

For example, when the assignable button 110C is operated with no half-pressing of the shutter button 110S, the focus area icon 78a indicating the tracking mode is displayed as shown in FIG. 6. This makes it possible for the user to recognize that the focus area setting is changed only by operating the assignable button 110C.

In the embodiment, when the tracking operation is detected with no detection of half-pressing and the half-pressing is detected after the tracking operation, the camera control unit 30 (tracking processing unit 62) performs the tracking processing for the subject to be focused, and the camera control unit 30 (AF control unit 52) performs AF control (i.e., tracking AF) for the subject to be tracked.

The patterns P3 and P4 of FIG. 11 illustrate cases where the assignable button 110C is operated with no half-pressing of the shutter button 110S, and half-pressing is performed thereafter. In this case, since half-pressing is performed, the state in which both the half-pressing and the tracking operation are performed is created, and tracking AF is started.

As a result, since tracking AF is performed by both half-pressing and the tracking operation regardless of the order, the user does not feel any confusion regarding operation, and operability can be improved.

In the embodiment, when tracking AF is performed in response to half-pressing and a tracking operation, if cancellation of half-pressing is detected, the tracking processing and AF control (tracking AF) are ended, and the focus area setting in AF control is maintained at the setting targeting the subject to be tracked.

The patterns P2 and P3 of FIG. 11 illustrate examples in which the focus area setting remains in the tracking mode when only the half-pressing of the shutter button 110S is canceled during the execution of tracking AF. That is, since it is assumed that the tracking operation by the assignable button 110C or 120C is being performed, the tracking mode is maintained. As a result, the user can understand that the focus area setting when performing the tracking operation is always the tracking mode, so that the user does not feel any confusion regarding operation, and operability can be improved.

In the first and second embodiments, examples have been given in which the tracking operation is performed as a continuous operation of the assignable button 110C or 120C, which is an operator for the tracking operation, and the tracking is canceled when the continuous operation is ended.

In the first and second embodiments, tracking AF is performed while the assignable button 110C or 120C is pressed. Tracking is ended by turning off the assignable button 110C or 120C. In this way, by performing tracking and tracking AF during continuous operation with one operator and stopping the tracking by stopping the continuous operation, it is possible to provide an operation method that is easy for the user to understand.

The third embodiment describes an example in which the tracking operation is performed as a single operation of the assignable button 110C, which is an operator for the tracking operation, and the tracking is canceled by another single operation of the operator. That is, tracking is turned on and off as a toggle operation of the button as an operator.

By thus enabling the start of tracking AF and the end of tracking as a toggle operation with a single operator in this way, it is possible to provide an operation method that is easy for the user to understand.

In the embodiment, the lens barrel 2B is provided with the assignable button 120C as a second operator. As a result, when the lens is replaced, the tracking operation can be easily operated with the left hand.

When the particularly heavy lens barrel 2B is mounted on the imaging device 1, the user supports the lens barrel 2B with his/her left hand. Since the assignable button 120C is provided in a position where it can be operated with the left hand supporting the lens barrel 2B as shown in the example of FIG. 3, operability can be improved.

The embodiment describes an example provided with an assignable button to which an operation function as the tracking operation can be selectively set. In other words, the assignable buttons 110C and 120C, which can be arbitrarily set by the user, are used as the second operator for the tracking operation.

As a result, the user can arbitrarily set the settings for the tracking operation, and the degree of freedom of use is increased.

In a case where multiple assignable buttons are provided, the user can select which assignable button to use as the tracking button, and make adjustments to match his/her own usage mode. It is also possible to select not to use the tracking button.

In the embodiment, the first operator for the AF operation is a shutter button, and half-pressing of the shutter button is the AF operation.

In other words, AF control is performed by half-pressing of the shutter button 110S, but tracking is left to the operation of another operator. Although execution of AF control by half-pressing is common, in the case of the present embodiment, it means that tracking is not performed only by half-pressing. This facilitates the shutter operation (full-pressing) after AF, and also prevents unintended tracking.

In the embodiment, it is assumed that the second operator for the tracking operation is provided at a position where it can be operated during the operation of the first operator.

For example, the shutter button 110S and the assignable button 110C can both be operated with one hand. For example, the assignable button 110C can be operated with the right thumb while operating the shutter button 110S with the right index finger.

Also, for example, the assignable button 120C can be operated with the left thumb while operating the shutter button 110S with the right index finger.

By setting the button arrangement in this way, the operability of the focus operation and the tracking operation can both be improved.

In particular, in the first and second embodiments, half-pressing of the shutter button 110S and the continued pressing of the assignable button 110C (120C) are performed at the same time. In this case, an appropriate button arrangement as in the embodiment facilitates the operation.

Note that while the assignable button 110C is used as the second operator in the embodiment, a dedicated tracking button instead of an assignable button may be provided, as a matter of course. In that case, too, it is preferable that the tracking button is provided at a position where it can be operated during the operation of the first operator (e.g., shutter button 110S).

6. Application Example

The technology according to the present disclosure can be applied to various products. For example, the technology of the present disclosure may be applied to an operating room system.

Figure 19:
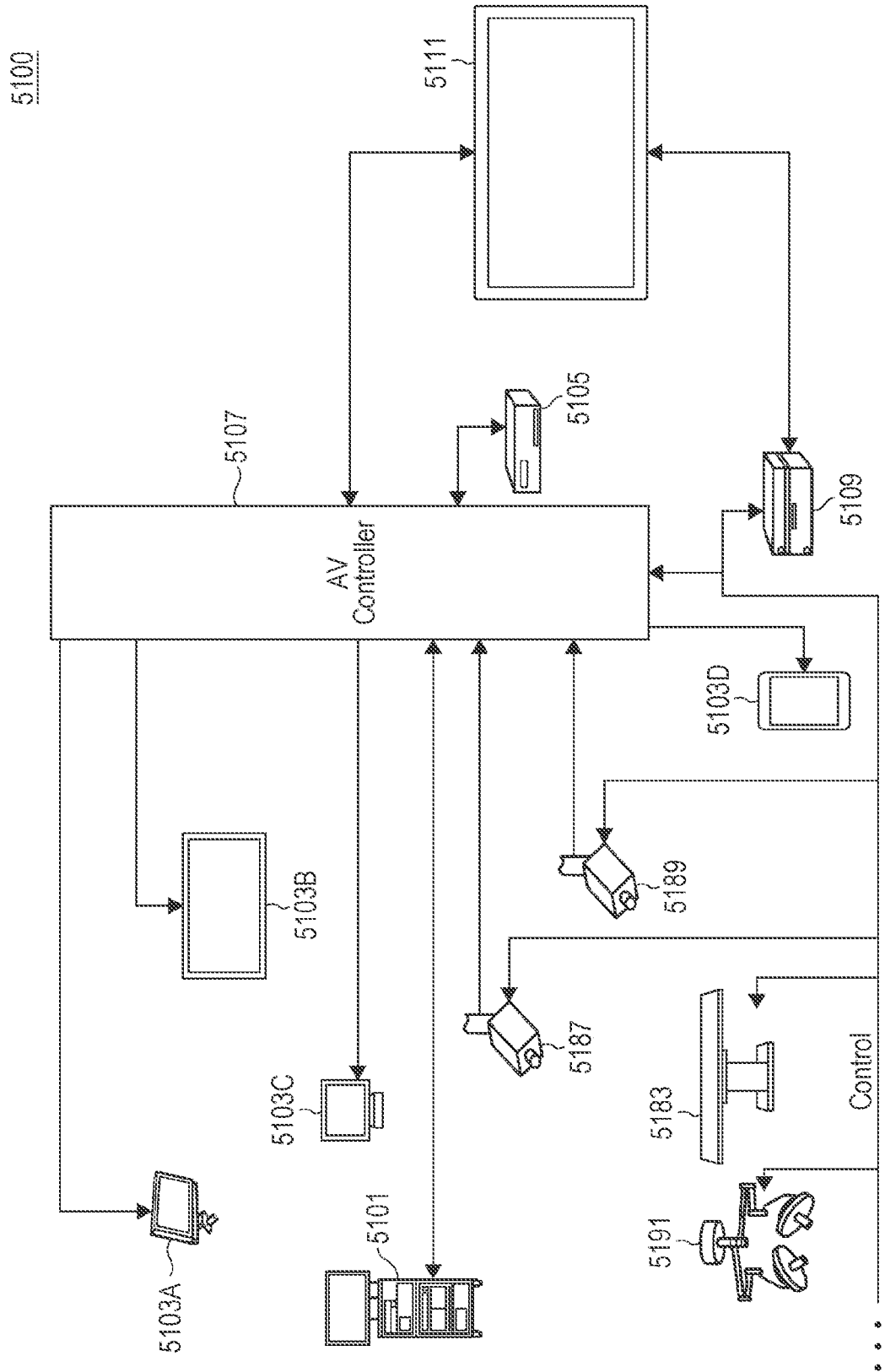
FIG. 19 is a diagram schematically showing an overall configuration of an operating room system.

FIG. 19 is a diagram schematically showing an overall configuration of an operating room system 5100 to which the technology according to the present disclosure can be applied. Referring to FIG. 19, the operating room system 5100 is configured by connecting a group of devices installed in the operating room in a coordinated manner through an audiovisual controller (AV controller) 5107 and an operating room control device 5109.

Various devices can be installed in the operating room. As an example, FIG. 19 shows a device group 5101 for endoscopic operation, a ceiling camera 5187 installed on the ceiling of the operating room to image the operator's hand, an operating room camera 5189 installed on the ceiling of the operating room to image the situation of the entire operating room, multiple display devices 5103A to 5103D, a recorder 5105, a patient bed 5183, and a lighting 5191.

Here, among these devices, the device group 5101 belongs to an endoscopic operation system 5113, which will be described later, and includes an endoscope, a display device for displaying an image captured by the endoscope, and the like. Each device belonging to the endoscopic operation system 5113 is also called medical equipment. On the other hand, the display devices 5103A to 5103D, the recorder 5105, the patient bed 5183, and the lighting 5191 are devices provided separately from the endoscopic operation system 5113 in the operating room, for example. Each of these devices that does not belong to the endoscopic operation system 5113 is also called non-medical equipment. The audiovisual controller 5107 and/or the operating room control device 5109 control the operation of the medical equipment and non-medical equipment in cooperation with each other.

The audiovisual controller 5107 comprehensively controls processing related to image display in medical equipment and non-medical equipment. Specifically, among the devices included in the operating room system 5100, the device group 5101, the ceiling camera 5187, and the operating room camera 5189 may be devices (hereinafter also referred to as source devices) having a function of transmitting information to be displayed during operation (hereinafter also referred to as display information). Additionally, the display devices 5103A to 5103D may be devices (hereinafter also referred to as output destination devices) on which display information is output. Additionally, the recorder 5105 may be a device corresponding to both the source device and the output destination device. The audiovisual controller 5107 has a function of controlling the operation of the source device and the output destination device, acquiring display information from the source device, and transmitting the display information to the output destination device for display or recording. Note that the display information includes various images captured during the operation and various information related to the operation (e.g., physical information of patient, past test results, information on surgical procedure, and the like).

Specifically, the audiovisual controller 5107 may receive from the device group 5101, as display information, information about an image of the surgical site in the body cavity of the patient captured by the endoscope. Additionally, the audiovisual controller 5107 may receive from the ceiling camera 5187, as display information, information about an image of the operator's hand captured by the ceiling camera 5187. Additionally, the audiovisual controller 5107 may receive from the operating room camera 5189, as display information, information about an image showing the situation of the entire operating room captured by the operating room camera 5189. Note that if the operating room system 5100 has another device having an imaging function, the audiovisual controller 5107 may also acquire information about an image captured by the other device from the other device as display information.

Alternatively, for example, the audiovisual controller 5107 records information about these previously captured images in the recorder 5105. The audiovisual controller 5107 can acquire the information about the previously captured image from the recorder 5105 as display information. Note that various information related to the operation may also be recorded in advance in the recorder 5105.

The audiovisual controller 5107 displays the acquired display information (i.e., image captured during operation and various information regarding operation) on at least one of the display devices 5103A to 5103D that are output destination devices. In the example shown in FIG. 19, the display device 5103A is a display device suspended from the ceiling of the operating room, the display device 5103B is a display device installed on a wall surface of the operating room, the display device 5103C is a display device installed on a desk in the operating room, and the display device 5103D is a mobile device (e.g., tablet personal computer (PC)) having a display function.

Additionally, although not shown in FIG. 19, the operating room system 5100 may include a device outside the operating room. The device outside the operating room may be, for example, a server connected to a network constructed inside or outside the hospital, a PC used by medical staff, a projector installed in a conference room of the hospital, or the like. In a case where such an external device is located outside the hospital, the audiovisual controller 5107 can also display information on a display device of another hospital through a video conferencing system or the like for telemedicine.

The operating room control device 5109 comprehensively controls processing other than processing related to image display in non-medical equipment. For example, the operating room control device 5109 controls driving of the patient bed 5183, the ceiling camera 5187, the operating room camera 5189, and the lighting 5191.

The operating room system 5100 is provided with a centralized operation panel 5111, and the user can give, through the centralized operation panel 5111, an instruction regarding image display to the audiovisual controller 5107 or an instruction regarding the operation of non-medical equipment to the operating room control device 5109. The centralized operation panel 5111 includes a touch panel provided on a display surface of the display device.

Figure 20:
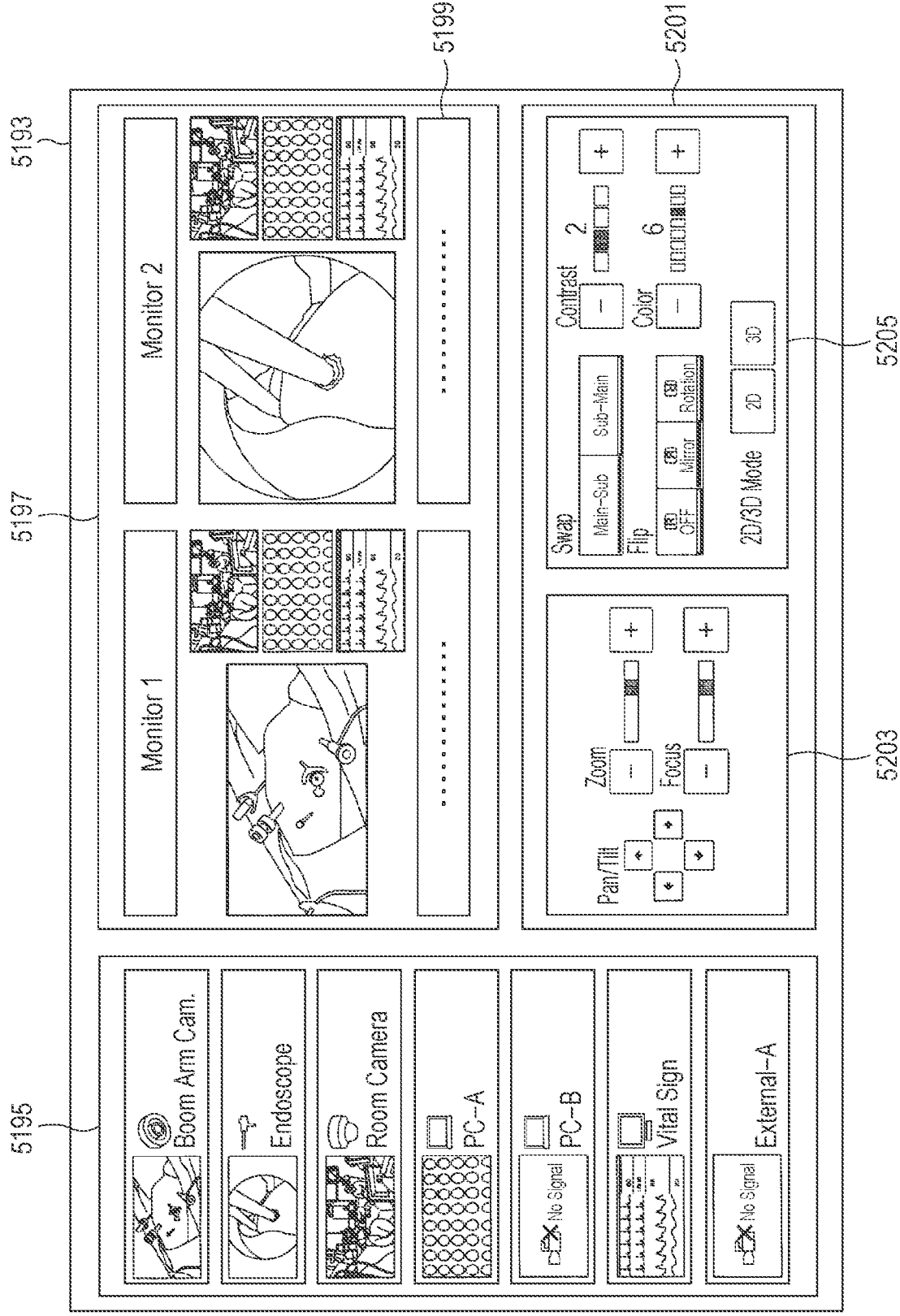
FIG. 20 is a diagram showing a display example of an operation screen on a centralized operation panel.

FIG. 20 is a diagram showing a display example of an operation screen on the centralized operation panel 5111. FIG. 20 shows, as an example, an operation screen corresponding to a case where the operating room system 5100 is provided with two display devices as output destination devices. Referring to FIG. 20, an operation screen 5193 is provided with a source selection area 5195, a preview area 5197, and a control area 5201.

In the source selection area 5195, the source device provided in the operating room system 5100 and a thumbnail screen showing the display information possessed by the source device are linked and displayed. The user can select the display information that he/she wants to display on the display device from any of the source devices displayed in the source selection area 5195.

In the preview area 5197, a preview of the screen displayed on the two display devices (Monitor 1 and Monitor 2), which are the output destination devices, is displayed. In the example shown in FIG. 20, four images are displayed in PinP on one display device. The four images correspond to the display information transmitted from the source devices selected in the source selection area 5195. Of the four images, one is displayed relatively large as a main image and the remaining three are displayed relatively small as sub-images. The user can swap the main image and the sub image by appropriately selecting the area where the four images are displayed. Additionally, a status display area 5199 is provided below the area where the four images are displayed, and a status related to the operation (e.g., elapsed time of operation, physical information of patient, or the like) may be appropriately displayed in the area.

The control area 5201 includes a source operation area 5203 in which graphical user interface (GUI) parts for operating the source device are displayed, and an output destination operation area 5205 in which GUI parts for operating the output destination device are displayed. In the example shown in FIG. 20, the source operation area 5203 includes GUI parts for performing various operations (pan, tilt, and zoom) on the camera in the source device having an imaging function. The user can operate the camera in the source device by appropriately selecting these GUI parts. Note that although not shown, in a case where the source device selected in the source selection area 5195 is a recorder (i.e., case where image previously recorded in recorder is displayed in preview area 5197), the source operation area 5203 may include GUI parts for performing operations such as playing back, stopping, rewinding, and fast-forwarding the image.

Additionally, the output destination operation area 5205 includes GUI parts for performing various operations (swap, flip, color adjustment, contrast adjustment, switching between 2D display and 3D display) for the display on the display device which is the output destination device. The user can operate the display on the display device by appropriately selecting these GUI parts.

Note that the operation screen displayed on the centralized operation panel 5111 is not limited to the example shown in FIG. 20, and the user may be allowed to input operation to devices controllable by the audiovisual controller 5107 and the operating room control device 5109 provided in the operating room system 5100, through the centralized operation panel 5111.

Figure 21:
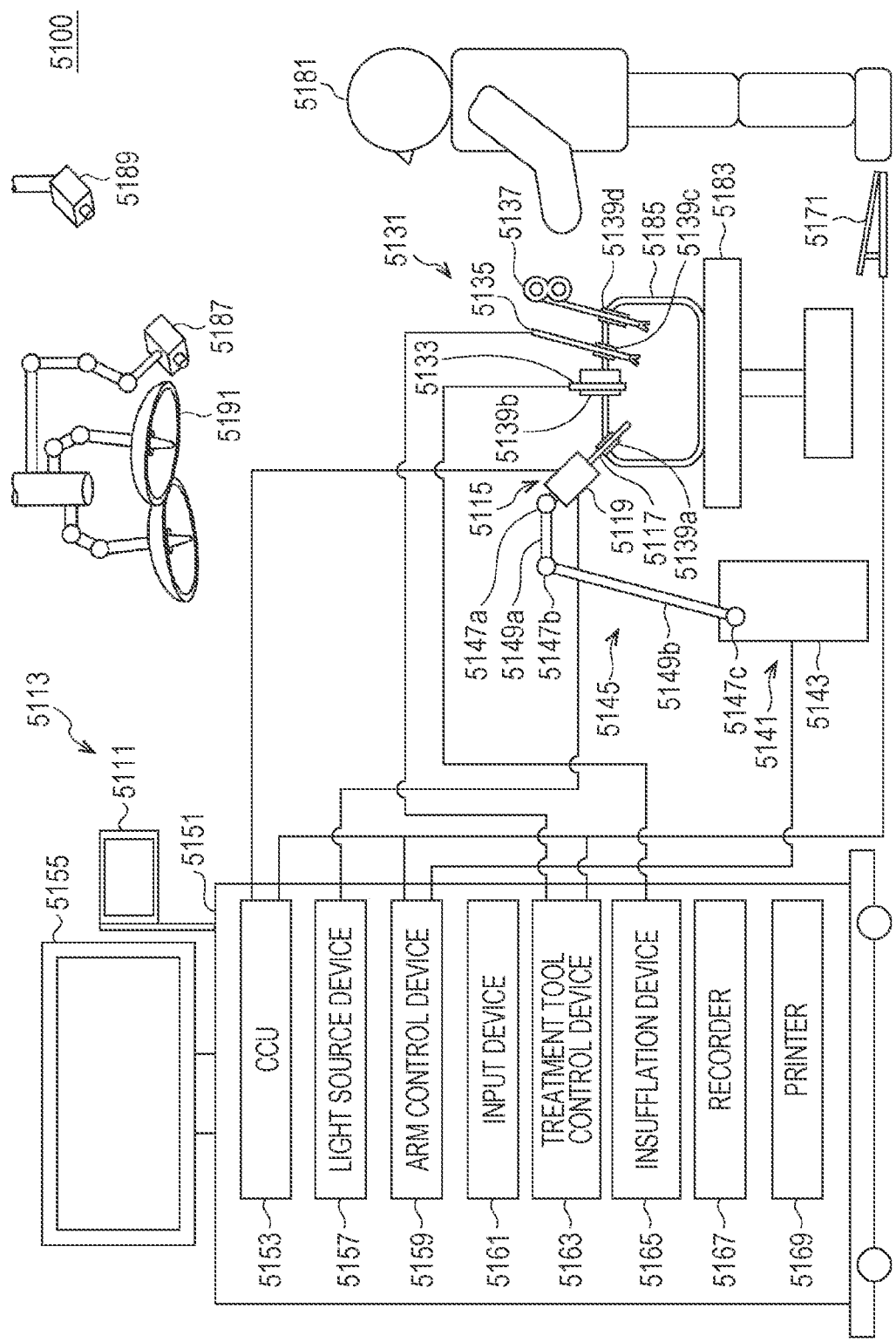
FIG. 21 is a diagram showing an example of a situation of an operation to which the operating room system is applied.

FIG. 21 is a diagram showing an example of a situation of an operation to which the operating room system described above is applied. The ceiling camera 5187 and the operating room camera 5189 are installed on the ceiling of the operating room, and can image the hand of an operator (surgeon) 5181 who treats the affected area of a patient 5185 on the patient bed 5183 and the situation of the entire operating room. The ceiling camera 5187 and the operating room camera 5189 may be provided with a magnification adjustment function, a focal length adjustment function, an imaging direction adjustment function, and the like. The lighting 5191 is installed on the ceiling of the operating room and illuminates at least the hand of the operator 5181. The lighting 5191 may be capable of appropriately adjusting the amount of irradiation light, the wavelength (color) of the irradiation light, the irradiation direction of the light, and the like.

The endoscopic operation system 5113, the patient bed 5183, the ceiling camera 5187, the operating room camera 5189, and the lighting 5191 are connected in a coordinated manner through the audiovisual controller 5107 and the operating room control device 5109 (not shown in FIG. 21), as shown in FIG. 19. The centralized operation panel 5111 is provided in the operating room, and as described above, the user can appropriately operate the devices existing in the operating room through the centralized operation panel 5111.

Hereinafter, a configuration of the endoscopic operation system 5113 will be described in detail. As shown in FIG. 21, the endoscopic operation system 5113 includes an endoscope 5115, other surgical tools 5131, a support arm device 5141 that supports the endoscope 5115, and a cart 5151 on which various devices for endoscopic operation are mounted.

In an endoscopic operation, instead of cutting the abdominal wall to open the abdomen, multiple tubular opening devices called trocars 5139a to 5139d are punctured in the abdominal wall. Then, a lens barrel 5117 of the endoscope 5115 and the other surgical tools 5131 are inserted into the body cavity of the patient 5185 from the trocars 5139a to 5139d. In the example shown in FIG. 21, an insufflation tube 5133, an energy treatment tool 5135, and forceps 5137 are inserted into the body cavity of the patient 5185 as the other surgical tools 5131. Additionally, the energy treatment tool

5135 is a treatment tool that performs incision and peeling of tissue, sealing of blood vessels, or the like by high-frequency current or ultrasonic vibration. Note, however, that the illustrated surgical tools 5131 are merely an example, and various surgical tools generally used in an endoscopic operation, such as tweezers and a retractor, may be used as the surgical tools 5131.

An image of the surgical site in the body cavity of the patient 5185 captured by the endoscope 5115 is displayed on a display device 5155. The operator 5181 uses the energy treatment tool 5135 and the forceps 5137 while viewing in real time the image of the surgical site displayed on the display device 5155, and performs treatment such as excising the affected area. Note that although illustration is omitted, the insufflation tube 5133, the energy treatment tool 5135, and the forceps 5137 are supported by the operator 5181 or an assistant during operation.

(Support Arm Device)

The support arm device 5141 includes an arm portion 5145 extending from a base portion 5143. In the example shown in FIG. 21, the arm portion 5145 includes joint portions 5147a, 5147b, and 5147c and links 5149a and 5149b, and is driven by control from an arm control device 5159. The arm portion 5145 supports the endoscope 5115, and controls its position and posture. As a result, the position of the endoscope 5115 can be stably fixed.

(Endoscope)

The endoscope 5115 includes the lens barrel 5117 whose area of a predetermined length from the tip end is inserted into the body cavity of the patient 5185, and a camera head 5119 connected to the base end of the lens barrel 5117. While FIG. 21 shows an example in which the endoscope 5115 is configured as a so-called rigid endoscope having a hard lens barrel 5117, the endoscope 5115 may be configured as a so-called flexible endoscope having a soft lens barrel 5117.

An opening into which an objective lens is fitted is provided at the tip end of the lens barrel 5117. A light source device 5157 is connected to the endoscope 5115, and light generated by the light source device 5157 is guided to the tip end of the lens barrel by a light guide extending inside the lens barrel 5117. The light is radiated toward the observation target in the body cavity of the patient 5185 through the objective lens. Note that the endoscope 5115 may be a forward-viewing endoscope, an oblique-viewing endoscope, or a side-viewing endoscope.

An optical system and an image sensor are provided inside the camera head 5119, and reflected light (observation light) from an observation target is focused on the image sensor by the optical system. Observation light is photoelectrically converted by the image sensor, and an electric signal corresponding to the observation light, that is, an image signal corresponding to the observed image is generated. The image signal is transmitted to a camera control unit (CCU) 5153 as RAW data. Note that the camera head 5119 has a function of adjusting the magnification and the focal length by appropriately driving the optical system.

Note that the camera head 5119 may be provided with multiple image sensors in order to support stereoscopic viewing (3D display), for example. In this case, multiple relay optical systems are provided inside the lens barrel 5117 in order to guide the observation light to each of the multiple image sensors.

(Various Devices Mounted on Cart)

The CCU 5153 includes a central processing unit (CPU), a graphics processing unit (GPU), and the like, and comprehensively controls operations of the endoscope 5115 and the display device 5155. Specifically, the CCU 5153 performs, on an image signal received from the camera head 5119, various image processing for displaying an image based on the image signal such as development processing (demosaicing processing). The CCU 5153 provides the image signal subjected to the image processing to the display device 5155. Additionally, the audiovisual controller 5107 shown in FIG. 19 is connected to the CCU 5153. The CCU 5153 provides the image signal subjected to image processing to the audiovisual controller 5107 as well. Additionally, the CCU 5153 also sends a control signal to the camera head 5119 to control the driving thereof. The control signal may include information regarding imaging conditions such as magnification and focal length. The information regarding the imaging conditions may be input through an input device 5161 or may be input through the centralized operation panel 5111 described above.

The display device 5155 displays an image based on the image signal subjected to image processing by the CCU 5153 under the control of the CCU 5153. In a case where the endoscope 5115 is compatible with high-resolution imaging such as 4K (horizontal pixel 3840×vertical pixel 2160) or 8K (horizontal pixel 7680×vertical pixel 4320), and/or 3D display, a device capable of high-resolution display and/or a device capable of 3D display can be used as the display device 5155 corresponding to the endoscopes 5115. In the case where the display device 5155 is compatible with high-resolution imaging such as 4K or 8K, a more immersive feeling can be obtained by using a display device 5155 having a size of 55 inches or more. Additionally, multiple display devices 5155 having different resolutions and sizes may be provided depending on the application.

The light source device 5157 includes a light source such as a light emitting diode (LED), for example, and supplies irradiation light for imaging a surgical site to the endoscope 5115.

The arm control device 5159 includes a processor such as a CPU, for example, and operates according to a predetermined program to control driving of the arm portion 5145 of the support arm device 5141 according to a predetermined control method.

The input device 5161 is an input interface for the endoscopic operation system 5113. The user can input various information and instructions to the endoscopic operation system 5113 through the input device 5161. For example, the user inputs various kinds of information regarding the operation, such as physical information of the patient and information regarding the surgical procedure, through the input device 5161. Additionally, for example, the user inputs, through the input device 5161, an instruction to drive the arm portion 5145, an instruction to change the imaging conditions (type of irradiation light, magnification, focal length, and the like) of the endoscope 5115, an instruction to drive the energy treatment tool 5135, and the like.

The type of the input device 5161 is not limited, and the input device 5161 may be various known input devices. As the input device 5161, a mouse, a keyboard, a touch panel, a switch, a foot switch 5171 and/or a lever can be applied, for example. In a case where a touch panel is used as the input device 5161, the touch panel may be provided on the display surface of the display device 5155.

Alternatively, the input device 5161 is a device worn by the user, such as a glasses-type wearable device or a head mounted display (HMD), and various inputs are performed according to the user's gesture or line-of-sight detected by these devices. Additionally, the input device 5161 includes a camera capable of detecting the movement of the user, and various inputs are performed according to the user's gesture or line-of-sight detected from an image captured by the camera. Moreover, the input device 5161 includes a microphone capable of collecting the voice of the user, and various inputs are performed by voice through the microphone. As described above, since the input device 5161 is capable of inputting various information in a contactless manner, a user (e.g., operator 5181) who belongs to a clean area can operate devices belonging to an unclean area in a contactless manner. Additionally, the user can operate the devices without releasing his/her hand from the surgical tool, which is convenient for the user.

A treatment tool control device 5163 controls driving of the energy treatment tool 5135 for tissue ablation, incision, blood vessel sealing, or the like. In order to inflate the body cavity of the patient 5185 for the purpose of securing the visual field of the endoscope 5115 and securing the operator's workspace, an insufflation device 5165 is used to send gas into the body cavity through the insufflation tube 5133. A recorder 5167 is a device capable of recording various information related to the operation. A printer 5169 is a device capable of printing various information related to the operation in various formats such as text, images, or graphs.

Hereinafter, a particularly characteristic configuration of the endoscopic operation system 5113 will be described in more detail.

(Support Arm Device)

The support arm device 5141 includes the base portion 5143, which is a base, and the arm portion 5145 extending from the base portion 5143. While the arm portion 5145 of the example shown in FIG. 21 includes the multiple joint portions 5147a, 5147b, and 5147c and the multiple links 5149a and 5149b connected by the joint portion 5147b, in FIG. 26, for simplicity, the configuration of the arm portion 5145 is shown in a simplified manner. In practice, the shapes, the number, and the arrangement of the joint portions 5147a to 5147c and the links 5149a and 5149b, the directions of the rotation axes of the joint portions 5147a to 5147c, and the like may be appropriately set to achieve a desired degree of freedom for the arm portion 5145. For example, the arm portion 5145 may suitably have six or more degrees of freedom. As a result, the endoscope 5115 can be freely moved within the movable range of the arm portion 5145, so that the lens barrel 5117 of the endoscope 5115 can be inserted into the body cavity of the patient 5185 from a desired direction.

The joint portions 5147a to 5147c are provided with actuators, and the joint portions 5147a to 5147c are rotatable about predetermined rotation axes by driving the actuators. Driving of the actuator is controlled by the arm control device 5159, whereby the rotation angles of the joint portions 5147a to 5147c are controlled and driving of the arm portion 5145 is controlled. As a result, the position and posture of the endoscope 5115 can be controlled. At this time, the arm control device 5159 can control driving of the arm portion 5145 by various known control methods such as force control or position control.

For example, when the operator 5181 inputs an operation appropriately through the input device 5161 (including foot switch 5171), the arm control device 5159 can appropriately control driving of the arm portion 5145 in accordance with the input operation, and control the position and posture of the endoscope 5115. According to this control, the endoscope 5115 at the tip end of the arm portion 5145 can be moved from an arbitrary position to an arbitrary position, and then be fixedly supported at the position to which it is moved. Note that the arm portion 5145 may be operated by a so-called master slave method. In this case, the arm portion 5145 can be remotely operated by the user through the input device 5161 installed at a place away from the operating room.

Additionally, in the case where force control is applied, the arm control device 5159 may perform so-called power assist control in which external force is received from the user, and the actuators of the joint portions 5147a to 5147c are driven so that the arm portion 5145 moves smoothly according to the external force. As a result, when the user moves the arm portion 5145 while touching the arm portion 5145 directly, he/she can move the arm portion 5145 with a relatively light force. Accordingly, the endoscope 5115 can be moved more intuitively with a simpler operation, which is convenient for the user.

Here, generally, in an endoscopic operation, a surgeon called a scopist supports the endoscope 5115. On the other hand, by using the support arm device 5141, it is possible to more reliably fix the position of the endoscope 5115 without manual labor. Hence, it is possible to reliably obtain an image of the surgical site and perform the operation smoothly.

Note that the arm control device 5159 does not necessarily have to be provided on the cart 5151. Additionally, the arm control device 5159 does not necessarily have to be one device. For example, the arm control device 5159 may be provided in each of the joint portions 5147a to 5147c of the arm portion 5145 of the support arm device 5141, and the multiple arm control devices 5159 may cooperate with each other to control driving of the arm portion 5145.

(Light Source Device)

The light source device 5157 supplies the endoscope 5115 with irradiation light for imaging a surgical site. The light source device 5157 includes an LED, a laser light source, or a white light source including a combination thereof, for example. At this time, in a case where a white light source is configured by a combination of RGB laser light sources, the output intensity and output timing of each color (each wavelength) can be controlled with high accuracy. Hence, white balance of the captured image can be adjusted in the light source device 5157. Additionally, in this case, it is also possible to capture images corresponding to RGB in a time-sharing manner, by irradiating the observation target with the laser light from each of the RGB laser light sources in a time-sharing manner, and controlling driving of the image sensor of the camera head 5119 in synchronization with the irradiation timing. According to this method, a color image can be obtained without providing a color filter in the image sensor.

Additionally, driving of the light source device 5157 may be controlled so as to change the intensity of light to be output every predetermined time. By acquiring images in a time-sharing manner by controlling driving of the image sensor of the camera head 5119 in synchronization with the timing of the change in the intensity of light and synthesizing the images, a wide-dynamic range image without so-called blackout and overexposure can be generated.

Additionally, the light source device 5157 may be capable of supplying light in a predetermined wavelength band corresponding to special light observation. In special light observation, so-called narrow band imaging is performed in which a predetermined tissue such as a blood vessel on the surface of the mucosa is imaged with high contrast, by utilizing the wavelength dependence of light absorption in body tissue and emitting light in a narrower band compared to irradiation light during normal observation (i.e., white light), for example. Alternatively, in special light observation, fluorescence observation may be performed in which an image is obtained by fluorescence generated by emitting excitation light. Examples of fluorescence observation include irradiating the body tissue with excitation light and observing fluorescence from the body tissue (autofluorescence observation), or locally injecting a reagent such as indocyanine green (ICG) into the body tissue and irradiating the body tissue with excitation light corresponding to the fluorescence wavelength of the reagent to obtain a fluorescence image, for example. The light source device 5157 may be capable of supplying narrowband light and/or excitation light corresponding to such special light observation.

(Camera Head and CCU)

Figure 22:
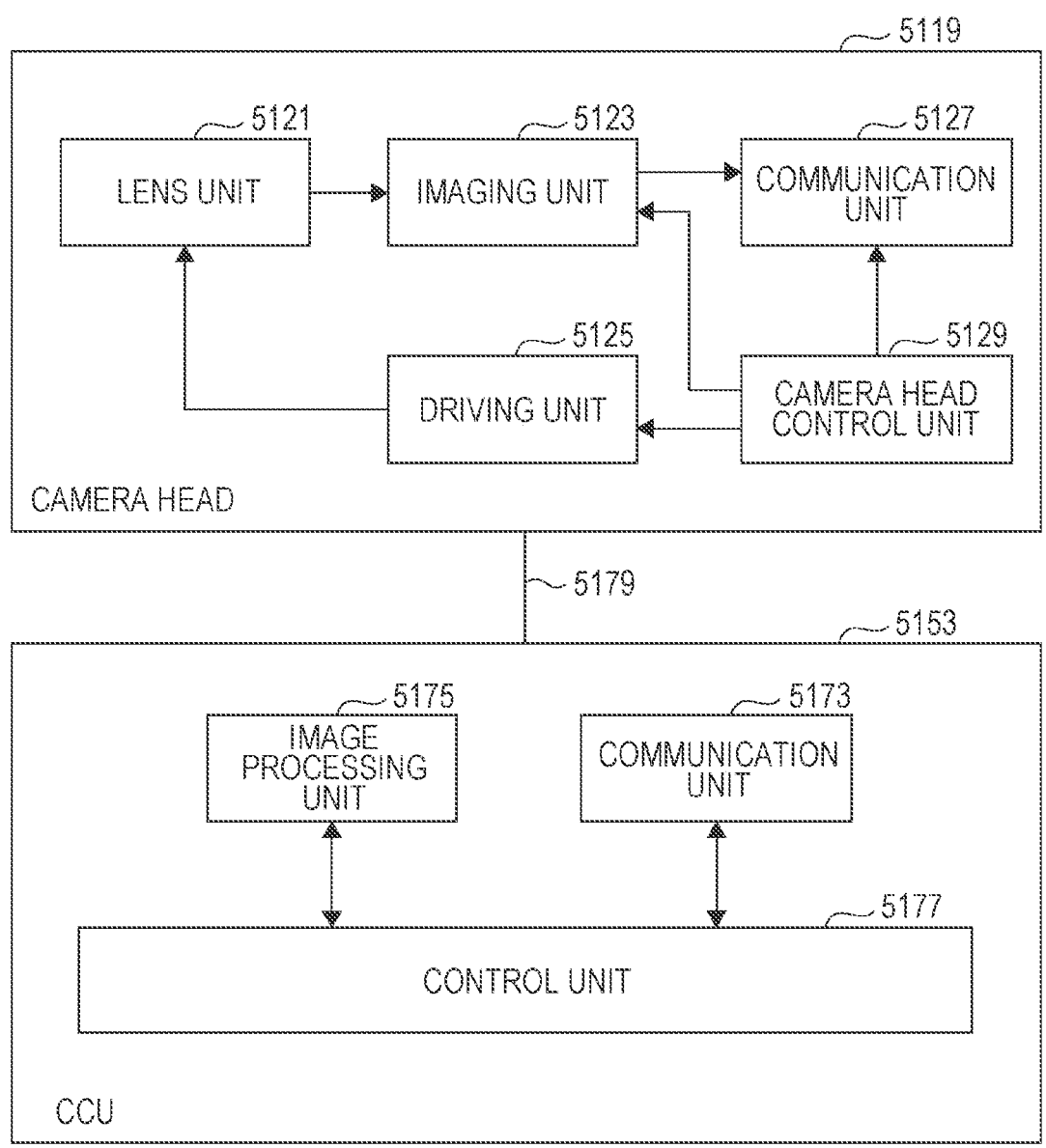
FIG. 22 is a block diagram showing an example of a functional configuration of a camera head and a CCU shown in FIG. 21.

The functions of the camera head 5119 of the endoscope 5115 and the CCU 5153 will be described in more detail with reference to FIG. 22. FIG. 22 is a block diagram showing an example of a functional configuration of the camera head 5119 and the CCU 5153 shown in FIG. 21.

Referring to FIG. 22, the camera head 5119 has, as its functions, a lens unit 5121, an imaging unit 5123, a driving unit 5125, a communication unit 5127, and a camera head control unit 5129. Additionally, the CCU 5153 has, as its functions, a communication unit 5173, an image processing unit 5175, and a control unit 5177. The camera head 5119 and the CCU 5153 are communicably connected to each other by a transmission cable 5179.

First, a functional configuration of the camera head 5119 will be described. The lens unit 5121 is an optical system provided at a connection portion with the lens barrel 5117. Observation light taken in from the tip end of the lens barrel 5117 is guided to the camera head 5119 and enters the lens unit 5121. The lens unit 5121 is configured by combining multiple lenses including a zoom lens and a focus lens. The optical characteristic of the lens unit 5121 is adjusted so that the observation light is focused on the light receiving surface of an image sensor of the imaging unit 5123. Additionally, the zoom lens and the focus lens are configured so that their positions on the optical axis can be moved in order to adjust the magnification and focus of the captured image.

The imaging unit 5123 includes an image sensor, and is arranged subsequent to the lens unit 5121. The observation light that has passed through the lens unit 5121 is focused on the light receiving surface of the image sensor, and an image signal corresponding to the observation image is generated by photoelectric conversion. The image signal generated by the imaging unit 5123 is provided to the communication unit 5127.

As the image sensor included in the imaging unit 5123, a complementary metal oxide semiconductor (CMOS) type image sensor, which has a Bayer array and is capable of color imaging, is used, for example. Note that as the image sensor, a device that supports imaging of a high-resolution image of 4K or higher may be used, for example. By obtaining the image of the surgical site with high resolution, the operator 5181 can grasp the state of the surgical site in more detail, and can proceed with the operation more smoothly.

Additionally, the image sensor included in the imaging unit 5123 has a pair of image sensors for acquiring the image signals for the right eye and the left eye corresponding to 3D display. The 3D display enables the operator 5181 to grasp the depth of the living tissue in the surgical site more accurately. Note that in a case where the imaging unit 5123 is a multi-plate type, multiple lens units 5121 are provided corresponding to the imaging devices.

Additionally, the imaging unit 5123 does not necessarily have to be provided in the camera head 5119. For example, the imaging unit 5123 may be provided inside the lens barrel 5117 immediately after the objective lens.

The driving unit 5125 includes an actuator, and moves the zoom lens and the focus lens of the lens unit 5121 by a predetermined distance along the optical axis under the control of the camera head control unit 5129. With this configuration, the magnification and focus of the image captured by the imaging unit 5123 can be adjusted as appropriate.

The communication unit 5127 includes a communication device for transmitting and receiving various information to and from the CCU 5153. The communication unit 5127 transmits the image signal obtained from the imaging unit 5123 as RAW data to the CCU 5153 through the transmission cable 5179. At this time, it is preferable that the image signal is transmitted by optical communication in order to display the captured image of the surgical site with low latency. At the time of operation, the operator 5181 performs the operation while observing the condition of the affected area with the captured image. Hence, for safer and more reliable operation, the dynamic image of the surgical site needs to be displayed as close to real-time as possible. In a case where optical communication is performed, the communication unit 5127 is provided with a photoelectric conversion module that converts an electric signal into an optical signal. The image signal is converted into an optical signal by the photoelectric conversion module and then transmitted to the CCU 5153 through the transmission cable 5179.

Additionally, the communication unit 5127 receives a control signal for controlling driving of the camera head 5119 from the CCU 5153. For example, the control signal includes information regarding imaging conditions such as information that specifies the frame rate of the captured image, information that specifies the exposure value at the time of imaging, and/or information that specifies the magnification and focus of the captured image. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electric signal. The control signal is converted into an electric signal by the photoelectric conversion module, and then provided to the camera head control unit 5129.

Note that the imaging conditions such as the frame rate, the exposure value, the magnification, and the focus described above are automatically set by the control unit 5177 of the CCU 5153 on the basis of the acquired image signal. That is, the so-called auto exposure (AE) function, auto focus (AF) function, and auto white balance (AWB) function are installed in the endoscope 5115.

The camera head control unit 5129 controls driving of the camera head 5119 on the basis of a control signal from the CCU 5153 received through the communication unit 5127. For example, the camera head control unit 5129 controls driving of the image sensor of the imaging unit 5123 on the basis of the information that specifies the frame rate of the captured image and/or the information that specifies the exposure at the time of imaging. Additionally, for example, the camera head control unit 5129 appropriately moves the zoom lens and the focus lens of the lens unit 5121 through the driving unit 5125 on the basis of the information that specifies the magnification and the focus of the captured image. The camera head control unit 5129 may further include a function of storing information for identifying the lens barrel 5117 and the camera head 5119.

Note that by arranging the lens unit 5121, the imaging unit 5123, and the like in a hermetically sealed and highly waterproof closed structure, the camera head 5119 can be made resistant to autoclave sterilization processing.

Next, a functional configuration of the CCU 5153 will be described. The communication unit 5173 includes a communication device for transmitting and receiving various information to and from the camera head 5119. The communication unit 5173 receives an image signal transmitted from the camera head 5119 through the transmission cable 5179. At this time, as described above, the image signal can be preferably transmitted by optical communication. In this case, to support optical communication, the communication unit 5173 is provided with a photoelectric conversion module that converts an optical signal into an electric signal. The communication unit 5173 provides the image signal converted into the electric signal to the image processing unit 5175.

Additionally, the communication unit 5173 transmits a control signal for controlling driving of the camera head 5119 to the camera head 5119. The control signal may also be transmitted by optical communication.

The image processing unit 5175 performs various image processing on the image signal that is RAW data transmitted from the camera head 5119. Examples of the image processing include various known signal processing such as development processing, enhancement processing (e.g., band emphasis processing, super-resolution processing, noise reduction (NR) processing, and/or camera shake correction processing), and/or enlargement processing (electronic zoom processing). Additionally, the image processing unit 5175 also performs detection processing on the image signal for performing AE, AF, and AWB.

The image processing unit 5175 includes a processor such as a CPU or a GPU, and the image processing and the detection processing described above can be performed by the processor operating according to a predetermined program. Note that in a case where the image processing unit 5175 includes multiple GPUs, the image processing unit 5175 appropriately divides information related to the image signal and performs image processing in parallel by the multiple GPUs.

The control unit 5177 performs various controls related to imaging of the surgical site by the endoscope 5115 and display of the captured image. For example, the control unit 5177 generates a control signal for controlling driving of the camera head 5119. At this time, in a case where the imaging conditions are input by the user, the control unit 5177 generates a control signal on the basis of the input by the user. Alternatively, in a case where the endoscope 5115 is equipped with an AE function, an AF function, and an AWB function, the control unit 5177 appropriately calculates the optimum exposure value, focal length, and white balance depending on the result of the detection processing by the image processing unit 5175, and generates a control signal.

Additionally, the control unit 5177 causes the display device 5155 to display an image of the surgical site on the basis of the image signal subjected to image processing by the image processing unit 5175. At this time, the control unit 5177 recognizes various objects in the image of the surgical site using various image recognition technologies. For example, the control unit 5177 can recognize surgical tools such as forceps, specific biological parts, bleeding, mist when using the energy treatment tool 5135, and the like by detecting the shape, color, and the like of the edge of the object included in the image of the surgical site. When displaying the image of the surgical site on the display device 5155, the control unit 5177 superimposes and displays various operation support information on the image of the surgical site using the recognition result. By superimposing and displaying the operation support information and presenting it to the operator 5181, it is possible to proceed with the operation more safely and reliably.

The transmission cable 5179 that connects the camera head 5119 and the CCU 5153 is an electric signal cable supporting electric signal communication, an optical fiber supporting optical communication, or a composite cable thereof.

Here, while communication is performed by wire using the transmission cable 5179 in the example shown in FIG. 27, communication between the camera head 5119 and the CCU 5153 may be performed wirelessly. In a case where the communication between the camera head 5119 and the CCU 5153 is performed wirelessly, it is not necessary to lay the transmission cable 5179 in the operating room. Hence, a situation in which the transmission cable 5179 hinders the movement of the medical staff in the operating room can be solved.

An example of the operating room system 5100 to which the technology according to the present disclosure can be applied has been described above. Note that while the case where the medical system to which the operating room system 5100 is applied is the endoscopic operation system 5113 has been described here as an example, the configuration of the operating room system 5100 is not limited to such an example. For example, the operating room system 5100 may be applied to an examination flexible endoscopic system or a microsurgery system instead of the endoscopic operation system 5113.

The technology of the present disclosure can be applied to the endoscope 5115 and the camera head 5119, among the configurations described above. Specifically, the camera head control unit 5129 can perform AF control and tracking processing as described in the above imaging device 1 in response to an AF operation and a tracking operation by another operator. As a result, the operator 5189 can use the AF operation and the tracking operation separately, and can perform AF and track at appropriate timings to monitor the surgical site image more appropriately.

In particular, considering the change in the movement of the endoscope 5115 and the positional relationship with the organs, it is very effective for the operator 5189 to be able to see the image with tracking AF that properly tracks and focuses on the part to be treated.

Note that it is conceivable that an operator for AF operation and an operator for tracking operation are each provided on the camera head 5119.

Additionally, for example, it is conceivable to provide an operator for AF operation on the camera head 5119 and assign an operator for tracking operation to the foot switch 5171. Although not limited to these, the operator for AF operation and the operator for tracking operation may be another operator that can be operated simultaneously by the operator 5189.

Note that the effect described in the present specification is merely an example and is not limited, and other effects can be obtained.

Note that the present technology can also be configured in the following manner.

(1)

An imaging device including an autofocus control unit that performs autofocus control in response to detection of a first operation using a first operator, and a tracking processing unit that performs tracking processing for a subject to be focused in response to detection of a second operation using a second operator different from the first operator in a state where autofocus control is performed in response to the first operation.

(2)

The imaging device according to (1) above, in which the autofocus control unit performs focus control on a subject to be tracked in response to the tracking processing being performed by the second operation in the state where the autofocus control is performed in response to the first operation.

(3)

The imaging device according to (1) or (2) above, further including a display control unit that performs control to change a display on a display unit indicating an operating state, depending on whether it is a first state where the autofocus control is performed in response to the first operation and the tracking processing is not performed, or it is a second state where the tracking processing and the focus control on the subject to be tracked are performed in response to the first operation and the second operation.

(4)

The imaging device according to any one of (1) to (3) above, further including a display control unit that controls a display operation of a display unit so that a focus frame indicating a focusing area is displayed at a predetermined position in a first state where the autofocus control is performed in response to the first operation and the tracking processing is not performed, and a tracking frame is displayed at a position of a subject image to be tracked in a second state where the tracking processing and the focus control on the subject to be tracked are performed in response to the first operation and the second operation.

(5)

The imaging device according to (4) above, in which the display control unit controls the display operation of the display unit so that in the second state, the tracking frame is displayed while maintaining display of the focus frame in the immediately preceding first state.

(6)

The imaging device according to (4) or (5) above, in which when transitioning from the second state to the first state, the autofocus control unit starts autofocus control before the start of the tracking operation in the immediately preceding second state, and the display control unit ends the display of the tracking frame and causes the focus frame to be displayed in a state before the start of tracking.

(7)

The imaging device according to (4) or (5) above, in which when transitioning from the second state to the first state, the autofocus control unit starts autofocus control for an area based on a position of the tracking frame at the end of tracking, and the display control unit ends the display of the tracking frame and causes the focus frame to be displayed at the position of the tracking frame at the end of tracking.

(8)

The imaging device according to (4) or (5) above, in which when transitioning from the second state to the first state, the autofocus control unit starts autofocus control targeting a fixed area of a captured image, and the display control unit ends the display of the tracking frame and causes the focus frame to be displayed in the fixed area of the captured image.

(9)

The imaging device according to any one of (1) to (8) above, in which when the second operation is detected with no detection of the first operation, a focus area setting in autofocus control is set to target a subject to be tracked.

(10)

The imaging device according to (9) above, further including a display control unit that causes a display unit to present a display corresponding to the fact that the focus area setting in autofocus control has been set to target the subject to be tracked when the second operation is detected with no detection of the first operation.

(11)

The imaging device according to any one of (1) to (10) above, in which in a case where the second operation is detected with no detection of the first operation and the first operation is detected after the second operation, the tracking processing unit performs tracking processing on a subject to be focused, and the autofocus control unit performs autofocus control on a subject to be tracked.

(12)

The imaging device according to any one of (1) to (11) above, in which when cancellation of the first operation is detected in a state where the tracking processing unit performs tracking processing on a subject to be focused and the autofocus control unit performs autofocus control on a subject to be tracked in response to the first operation and the second operation, the tracking processing and the autofocus control are ended, and a focus area setting in autofocus control is maintained at the setting that targets the subject to be tracked.

(13)

The imaging device according to any one of (1) to (12) above, in which the second operation is performed as a continuous operation of the operator for the second operation, and the second operation is canceled with the end of the continuous operation.

(14)

The imaging device according to any one of (1) to (12) above, in which
the second operation is performed as a single operation of the operator for the second operation, and the second operation is canceled by another single operation of the operator.

(15)

The imaging device according to any one of (1) to (14) above, in which
the second operator is provided on a lens barrel that is mountable on an imaging device main body.

(16)

The imaging device according to any one of (1) to (15) above, in which
an assignable button to which an operation function as the second operation can be selectively set is provided.

(17)

The imaging device according to any one of (1) to (16) above, in which
the first operator is a shutter operator, and half-pressing of the shutter operator is the first operation.

(18)

The imaging device according to any one of (1) to (17) above, in which
the second operator is provided at a position where it is operable during operation of the first operator.

(19)

An imaging control device including
an autofocus control unit that performs autofocus control in response to detection of a first operation using a first operator, and
a tracking processing unit that performs tracking processing for a subject to be focused in response to detection of a second operation using a second operator different from the first operator in a state where autofocus control is performed in response to the first operation.

(20)

An imaging method including
performing autofocus control in response to detection of a first operation using a first operator, and
performing tracking processing for a subject to be focused in response to detection of a second operation using a second operator different from the first operator in a state where autofocus control is performed in response to the first operation
by an imaging device.

REFERENCE SIGNS LIST

1 Imaging device
2, 2A, 2B Lens barrel
12 Image sensor
13 Camera signal processing unit
14 Recording unit
15 Display unit
16 Output unit
17 Operation unit
18 Power supply unit
21 Lens system
22 Driver unit
23 Lens control unit
24 Operation unit
30 Camera control unit
31 Memory unit
51 AF distance measuring unit
52 AF control unit
53 Image recognition unit
54 Operation recognition unit
55 Display control unit
56 Custom button setting unit
61 Face/pupil detection unit
62 Subject tracking unit
63 Subject face determination unit
78 Focus area icon
79 Focus mode icon
90 Focus frame
91 Tracking frame
100 Main body housing
101 Display panel
102 Viewfinder
103 Grip portion
110, 120 Operator
110S Shutter button
110C, 120C Assignable button

The invention claimed is:

1. An imaging device, comprising:
a plurality of assignable buttons; and
circuitry configured to:
perform autofocus control of a subject, wherein the autofocus control of the subject starts based on detection of a first operation associated with a first operator;
select a second operator, to which a second operation is assigned, from the plurality of assignable buttons based on user input, wherein the second operator is different from the first operator; and
perform a tracking operation for the subject, wherein the tracking operation for the subject starts based on detection of the second operation associated with the second operator in a state where the autofocus control is performed.

2. The imaging device according to claim 1, wherein the circuitry is further configured to perform the autofocus control on the subject to be tracked based on the tracking operation by the second operation in the state where the autofocus control is performed.

3. The imaging device according to claim 1, wherein the circuitry is further configured to perform control to change a display on a display device indicating an operating state, based on:
a first state where the autofocus control is performed based on the first operation and the tracking operation is not performed, or
a second state where the tracking operation and the autofocus control on the subject are performed based on the first operation and the second operation.

4. The imaging device according to claim 1, wherein the circuitry is further configured to control a display operation of a display device so that:
a focus frame indicating a focus area is displayed at a determined position in a first state, wherein the first state corresponds to a state where the autofocus control is performed based on the first operation and the tracking operation is not performed, and
a tracking frame is displayed at a position of a subject image to be tracked in a second state, wherein the second state corresponds to a state where the tracking operation and the autofocus control on the subject are performed based on the first operation and the second operation.

5. The imaging device according to claim 4, wherein the circuitry is further configured to control the display operation of the display device so that in the second state, the tracking frame is displayed while display of the focus frame in the first state is maintained.

6. The imaging device according to claim 4, wherein based on a transition from the second state to the first state, the circuitry is further configured to:
   start the autofocus control before start of the tracking operation in the second state; and
   end the display of the tracking frame and cause the focus frame to be displayed in a state before the start of the tracking operation.

7. The imaging device according to claim 4, wherein based on a transition from the second state to the first state, the circuitry is further configured to:
   start the autofocus control for an area based on a position of the tracking frame at an end of the tracking operation; and
   end the display of the tracking frame and cause the focus frame to be displayed at the position of the tracking frame at the end of the tracking operation.

8. The imaging device according to claim 4, wherein based on a transition from the second state to the first state, the circuitry is further configured to:
   start the autofocus control that targets a fixed area of a captured image; and
   end the display of the tracking frame and cause the focus frame to be displayed in the fixed area of the captured image.

9. The imaging device according to claim 1, wherein based on the detection of the second operation with no detection of the first operation, the circuitry is further configured to set a focus area setting in the autofocus control to target the subject to be tracked.

10. The imaging device according to claim 9, wherein the circuitry is configured to cause a display device to present a display based on the detection of the second operation with no detection of the first operation, and the display indicates that the focus area setting in the autofocus control is set to target the subject to be tracked.

11. The imaging device according to claim 1, wherein based on the detection of the second operation with no detection of the first operation and the detection of the first operation after the second operation, the circuitry is further configured to:
   perform the tracking operation on the subject to be focused; and
   perform the autofocus control on the subject to be tracked.

12. The imaging device according to claim 1, wherein based on detection of cancellation of the first operation in a state where the tracking operation on the subject to be focused and the autofocus control on the subject to be tracked are performed,
   the tracking operation and the autofocus control are ended, and
   a focus area setting in the autofocus control is maintained at a setting that targets the subject to be tracked.

13. The imaging device according to claim 1, wherein the second operation is a first single operation of the second operator, and
   the second operation is canceled by a second single operation of the second operator.

14. The imaging device according to claim 1, wherein the second operator is on a lens barrel that is mountable on an imaging device main body.

15. The imaging device according to claim 1, wherein the first operator is a shutter operator, and
   the first operation is a half-press of the shutter operator.

16. The imaging device according to claim 1, wherein the second operator is at a position operable during operation of the first operator.

17. The imaging device according to claim 1, wherein the second operation to start the tracking operation is a continuous pressing operation of the second operator, and
   the second operation is canceled with an end of the continuous pressing operation.

18. An imaging control device, comprising:
circuitry configured to:
   perform autofocus control of a subject, wherein the autofocus control of the subject starts based on detection of a first operation associated with a first operator;
   select a second operator, to which a second operation is assigned, from a plurality of assignable buttons based on user input, wherein the second operator is different from the first operator; and
   perform a tracking operation for the subject, wherein the tracking operation for the subject starts based on detection of the second operation associated with the second operator in a state where the autofocus control is performed.

19. An imaging method, comprising:
in an imaging device that includes a plurality of assignable buttons:
   performing autofocus control of a subject, wherein the autofocus control of the subject starts based on detection of a first operation associated with a first operator;
   selecting a second operator, to which a second operation is assigned, from the plurality of assignable buttons based on user input, wherein the second operator is different from the first operator; and
   performing a tracking operation for the subject, wherein
      the tracking operation starts based on detection of the second operation associated with the second operator in a state where the autofocus control is performed by the imaging device.

* * * * *